United States Patent [19]
Ramanathan et al.

[11] Patent Number: 6,041,041
[45] Date of Patent: Mar. 21, 2000

[54] METHOD AND SYSTEM FOR MANAGING DATA SERVICE SYSTEMS

[76] Inventors: Srinivas Ramanathan, 655 S. Farioaks Ave., Sunnyvale, Calif. 94086; Edward H. Perry, 484 Franklin St., Mountain View, Calif. 94041; Tai Jin, 1900 Parkwood Dr., San Mateo, Calif. 94403

[21] Appl. No.: 08/838,117

[22] Filed: Apr. 15, 1997

[51] Int. Cl.[7] .................................................. H04J 3/14
[52] U.S. Cl. ............................................ 370/241; 714/25
[58] Field of Search .................................... 370/241, 242, 370/244, 248, 250, 252, 401; 709/224; 714/25, 37, 38

[56] References Cited

U.S. PATENT DOCUMENTS

| | | | |
|---|---|---|---|
| 4,552,997 | 11/1985 | Daniels et al. | 370/250 |
| 5,276,676 | 1/1994 | Horn et al. | 370/253 |
| 5,677,912 | 10/1997 | Smith | 370/218 |
| 5,724,510 | 3/1998 | Arndt et al. | 370/252 |
| 5,737,517 | 4/1998 | Kite et al. | 714/38 |
| 5,881,051 | 3/1999 | Arrowood et al. | 370/248 |
| 5,901,141 | 5/1999 | Gruber et al. | 370/248 |

*Primary Examiner*—Min Jung
*Attorney, Agent, or Firm*—Thomas X. Li

[57] ABSTRACT

A scheme is described for a data service system having a number of modules. Some of the modules are interdependent. To measure the status of an individual module, the scheme first collects measurements from a number of measurement routes that involve the module. Then the scheme analyzes the interdependencies of the measurements to determine the status of the individual module. The scheme may also determine status of the data service system with a minimal number of measurement routes. This is done by determining (1) all possible measurement routes, (2) determining the dependency between the modules and the measurement routes, and (3) analyzing the dependency to select minimal number of the measurement routes. The scheme can diagnose whether a module is a problematic module or not by analyzing a number of measurements that involve the module. If one of the measurements is good, the module is identified as non-problematic. The data service system may also include a test target coupled to a networking module of the data service system to allow service test signals to be measured through the network module.

30 Claims, 27 Drawing Sheets

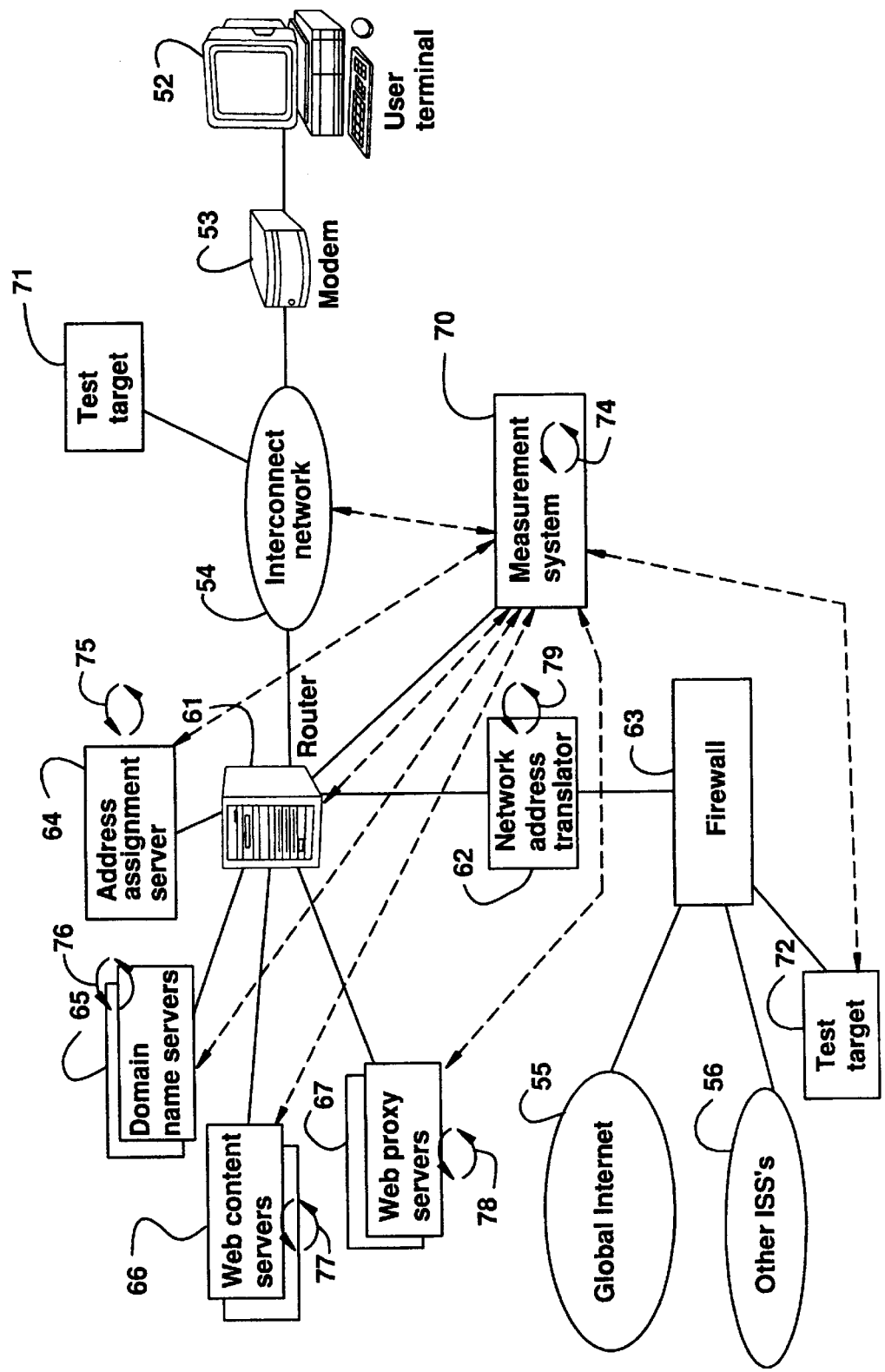

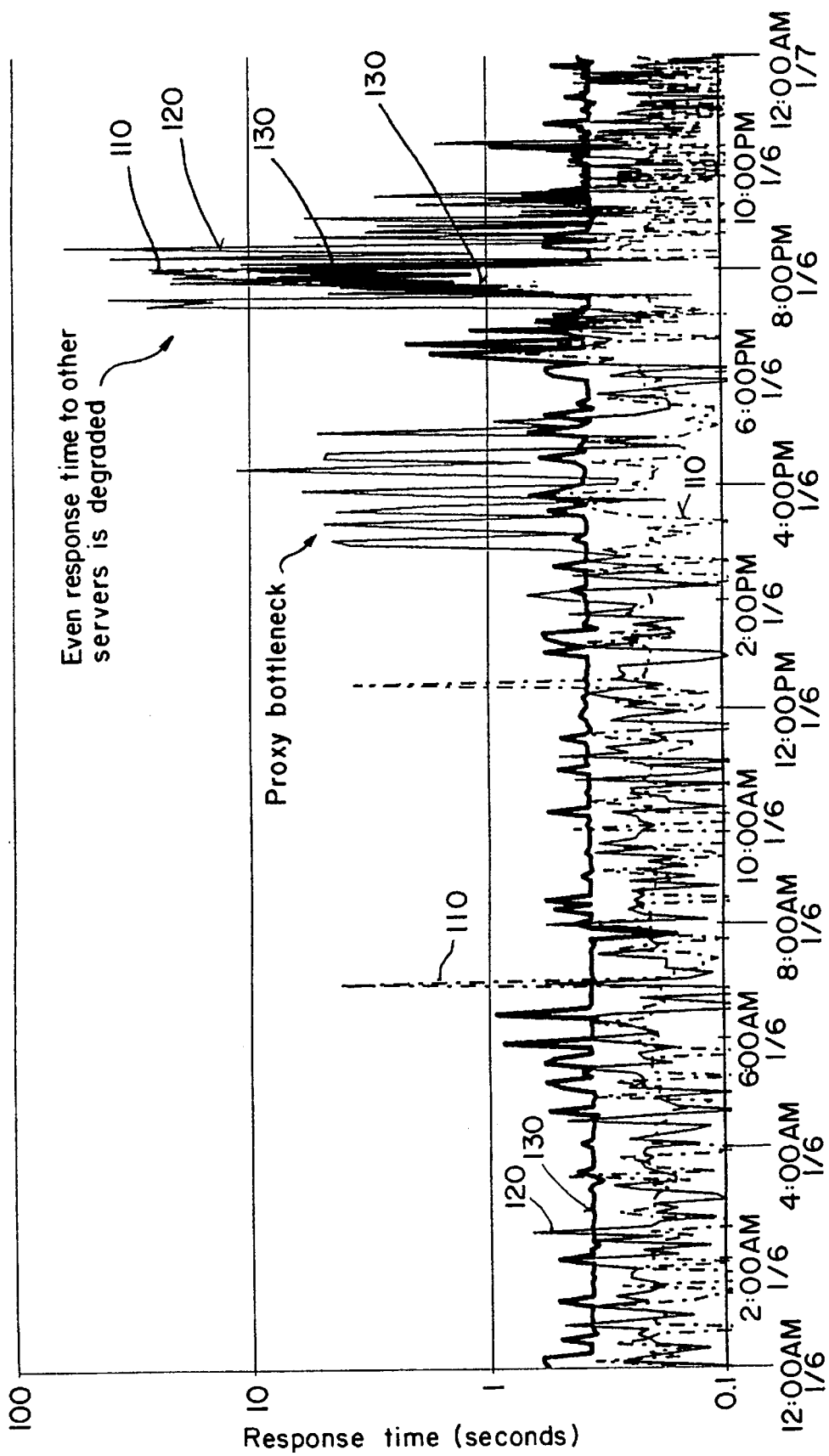

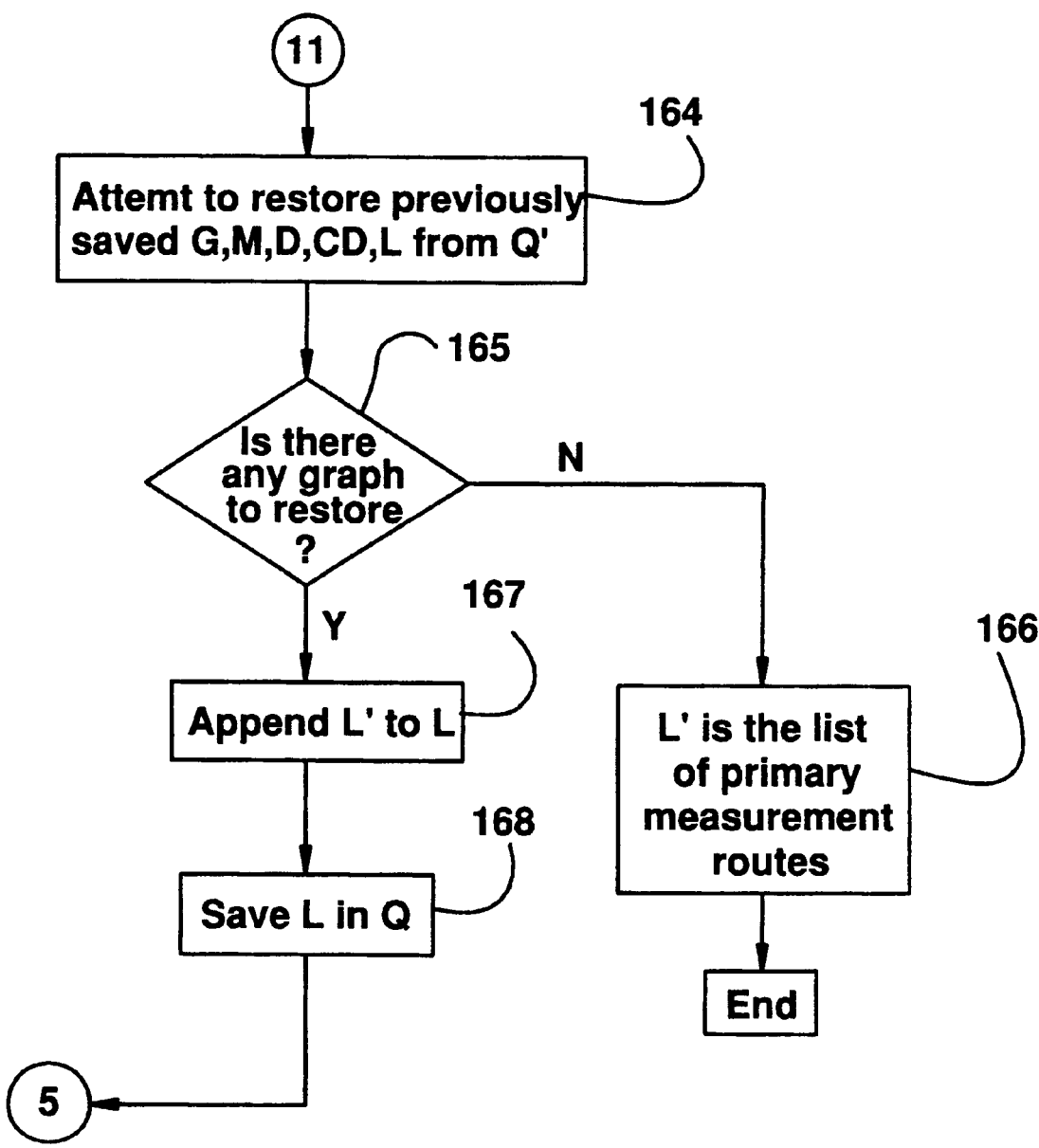

METHOD AND SYSTEM FOR MANAGING DATA SERVICE SYSTEMS

BACKGROUND OF THE INVENTION

1. Field of the Invention

The present invention pertains to data service systems. More particularly, this invention relates to a system and method for providing integrated management of the availability and performance of a data service system having interdependent functional modules.

2. Description of the Related Art

FIG. 1 shows a prior art Internet or Intranet access system 10. As can be seen from FIG. 1, the access system 10 typically includes an Internet/Intranet service system (ISS) 20 and an interconnect network 14 that connects the ISS 20 to subscriber sites (FIG. 1 only shows one such site 11). Subscribers connect directly to the ISS 20 from their terminals (e.g., personal computers, Macintoshes, Web terminals, etc.). A modem 13 may be used to connect the user terminal 12 to the ISS 20.

The ISS 20 typically includes web content servers 24 that store data for access from the subscriber sites. The content servers 24 typically support servers for Internet applications, such as electronic mail, bulletin boards, news groups, and World Wide Web access. In addition, the ISS 20 may have web proxy servers 25 that allow a network administrator to restrict access to the global Internet 15 or other ISSs 16. Another use of the proxy servers 25 is to cache frequently accessed data from the Internet. The ISS 20 may also include address assignment servers 22 and a network address translator 27. The address assignment servers 22 assigns an address to a user terminal when it is first connected to the ISS 20. The assigned address uniquely identifies the terminal in the ISS 20. The network address translator 27 is used when the ISS 20 uses different addresses for communication within the system 20 and for communication outside the system 20.

Subscribers in the ISS 20 usually refer to servers in the ISS 20, in the global Internet 15, and other ISSs 16, by their host names. However, routing of packets to and from the servers is based on network addresses assigned to the servers rather than the host names. In the ISS 20, Domain name servers (DNS) 23 are used to translate subscriber references to host names into network addresses of the servers. The DNS 23 may themselves rely on other DNS servers in the global Internet 15 and other ISSs 16 to determine the host name to network address mappings.

Other components or modules that are typical of the ISS are a firewall 26 that controls access to and from the system 20, and a router or routers 21 for routing transmissions to and from subscribers, and to and from the global Internet 15 and other ISSs 16.

Data transfer between the ISS 20 and the subscriber site 11 is provided by the interconnect network 14. The network 14 can use a number of technologies supporting a wide range of bandwidths.

In the ISS 20, the Internet Protocol (IP) is typically used for data communication to and from the various access servers 22–27, as well as with the global Internet 15 and other ISSs 16. The Transmission Control Protocol (TCP) that operates above the IP layer and ensures reliable delivery of information to and from the access servers is used for reliable access to the web and proxy servers in the ISS 20, the global Internet 15, and other ISSs 16. The application protocols used above the TCP layer are specific to the applications being accessed by subscribers. For example, the File Transfer Protocol (FTP) is used for file transfers and the Hyper Text Transport Protocol (HTTP) is used for web accesses.

Management of a data service system (e.g., ISS 20) typically includes the following functions: (1) monitoring the availability and performance of the system; and (2) diagnosing the availability and performance problems that occur during the operation of the system. Of course, the management may include other functions.

Prior art testing and measurement tools have been developed to enable management of the individual functional modules of the ISS. For example, a prior art Multi-Router Traffic Grapher (MRTG) testing tool enables the forwarding rate of a router over time to be observed. Another prior art testing tool, PerfView (made by Hewlett-Packard Co. of Palo Alto, Calif.), can monitor CPU, disk, and memory utilization on a specific host system. The resource consumption of specific functional modules (e.g., web content servers) can also be monitored using PerfView. Tools for monitoring the performance of web content servers have also been developed, e.g., the public domain timeit tool. Moreover, many testing tools have also been developed to measure the performance of the interconnect network. These tools include Netperf, throughput TCP (ttcp).

One drawback of the prior art testing technologies is that they only measure the status (i.e., availability and performance) of individual modules without taking into consideration of the services the system provides. To assess the status of the ISS 20 and the various services offered by the ISS 20 (e.g., news, FTP, Web access, etc.), a network operator has to manually check (i.e., individually test) each module of the ISS to determine the module's status and then correlate the status of all of the modules to figure out where the problem is in the ISS 20. This requires that the network operator understand not only the interconnections between the different modules of the ISS 20 but also the logical interdependencies between these modules. The difficulty of this process is illustrated by way of an example in FIG. 2, which shows that a user accesses a web site at the global Internet 15 via the proxy server 25. Although the data transfer occurs from the Internet web site via the proxy server 25, the actual access requires the access of the DNS 23 to obtain the IP address of that particular web site. Only after the IP address of the web site has been determined, the proxy server 25 can accesses the global Internet 15. To assess the status of the ISS 20, the operator has not only to check the network routes between the proxy server 25 and the global Internet 15 and between the proxy server 25 and the user terminal 12, but to be aware of the dependency of the web service on the DNS server 23 and test the DNS server as well. If the web operator only checks the modules along the network route, the problem module (i.e., DNS 23) can not be identified. The diagnosis of availability and performance problems in the ISS 20 gets more complex as the number of modules in the ISS 20 increases.

Another drawback is that since modules are measured in isolation, their measurements do not assess the availability and performance of the modules as the availability and performance relate to the service being provided using the modules. For example, the performance measurements for a firewall measured in isolation are CPU utilization at the firewall, packet handling rate (i.e., packets per second) of the firewall, the delay introduced by the firewall in routing a packet, and the number of packets discarded by the firewall per second because of buffer overflows. However, the impact of the firewall performance on the ISS system depends on several factors that are external to the firewall. These factors include the specific TCP (Transmission Control Protocol), the TCP/IP stack used in users' terminal and in the web content and proxy servers, the TCP window size used by the web browser and web server application modules, and the size of the data transfer. Furthermore, the location of the firewall in the topology of the ISS system determines which of the functional modules the firewall impacts. Therefore, the precise impact of the firewall performance on the performance of the ISS system cannot be measured by considering the firewall in isolation.

SUMMARY OF THE INVENTION

One feature of the present invention is to obtain status (i.e., availability and performance) information of a data service system having interdependent modules with a minimal number of measurements performed on the system.

Another feature of the present invention is to determine the status of a module of a data service system having a number of interdependent modules.

A further feature of the present invention is to identify one or more problem modules in a data service system having interdependent modules.

Described below is a scheme for a data service system having a number of modules some of which are interdependent. To measure the status of an individual module, the scheme first collects measurements from at least one measurement route that involves the module. Then the scheme analyzes the interdependencies of the measurements to determine the status of the individual module.

The scheme can also determine status of the data service system with a minimal number of measurements. The scheme first determines all possible measurement routes for measuring all of the modules based on a predetermined topology of the system. The scheme then determines the dependencies between the modules and the measurement routes. The dependencies are then analyzed to select a minimal number of measurement routes that involve all of the modules to determine the status of the system.

Moreover, the scheme can diagnose whether a module of the data service system is a problematic module or not. This can be done by first analyzing a number of measurements that involve the module. If one of the measurements is good, then the scheme identifies the module as non-problematic module. If one of the measurements that only involves the module is bad, then the scheme identifies the module as problematic.

Further, at least one test target is coupled to a module in the data service system. The test target has a predetermined function and performance status. The test target allows service test signals to be measured through the module.

Other features and advantages of the present invention will become apparent from the following detailed description, taken in conjunction with the accompanying drawings, illustrating by way of example the principles of the invention.

BRIEF DESCRIPTION OF THE DRAWINGS

FIG. 4 illustrates monitors of the measurement system of FIG. 3 that make measurements at various modules;

FIGS. 9A and 9B show the measurements obtained from two of the measurement routes shown in FIG. 8, wherein FIGS. 9A and 9B show the measurements for two different but overlapping time periods;

FIG. 9C shows the measurements obtained from all of the measurement routes shown in FIG. 8 for the same time period as shown in FIG. 9B;

FIGS. 10A through 10D show in flow chart diagram form the scheme of determining the minimum number of measurement routes within which the status of the data service system can be measured;

DETAILED DESCRIPTION OF THE INVENTION

Figure 1:
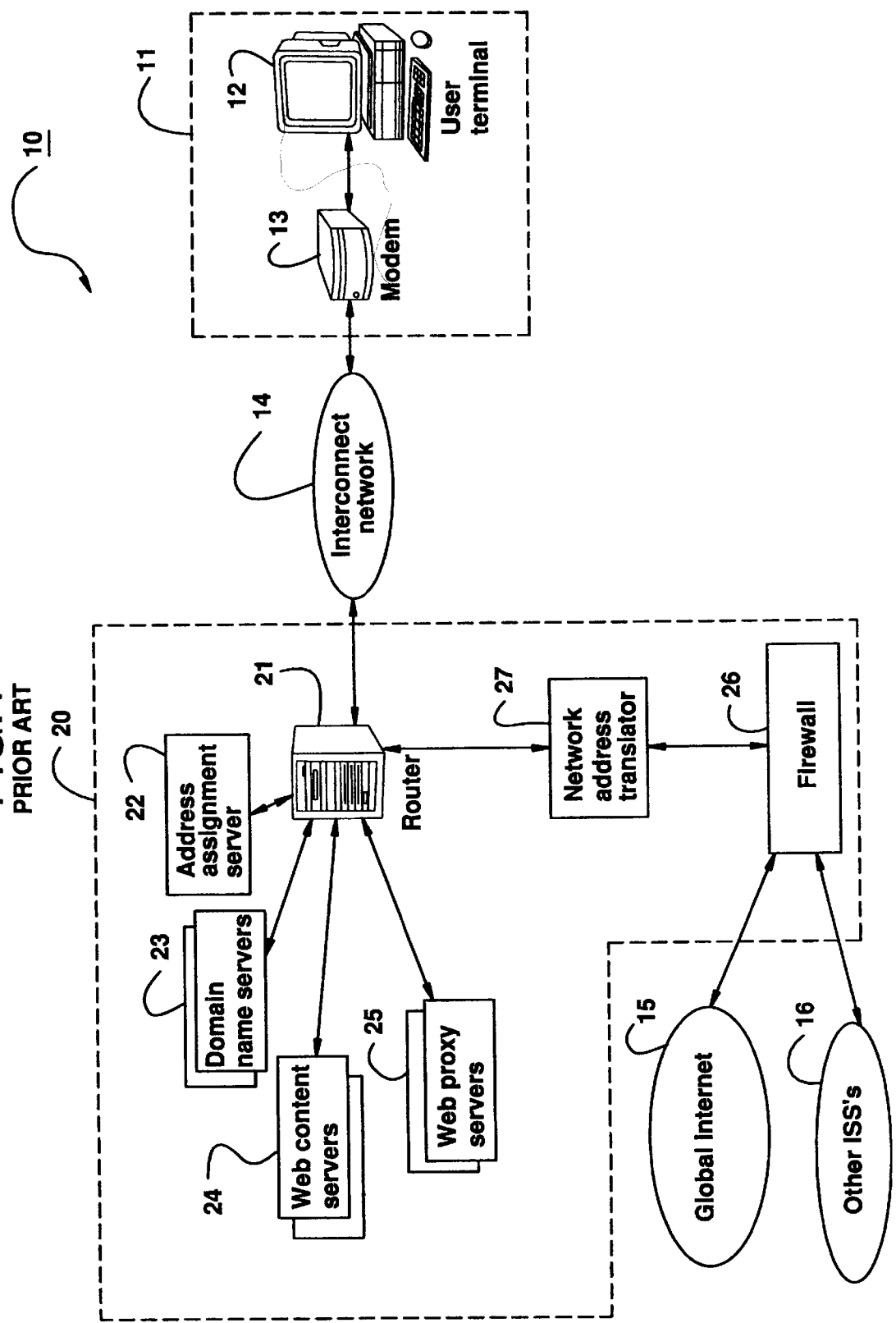
FIG. 1 shows a prior art data access network system that includes a data service system.
Figure 2:
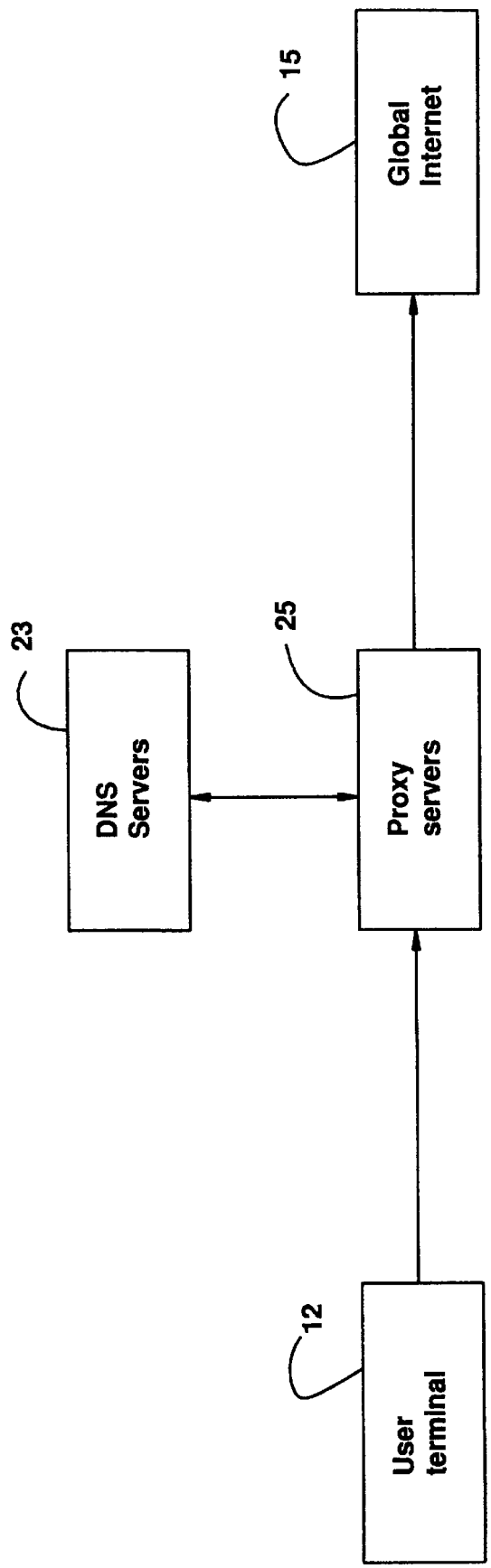
FIG. 2 shows an example of an actual access route within the prior art data access network system of FIG. 1 from the user terminal to the global Internet.
Figure 3:
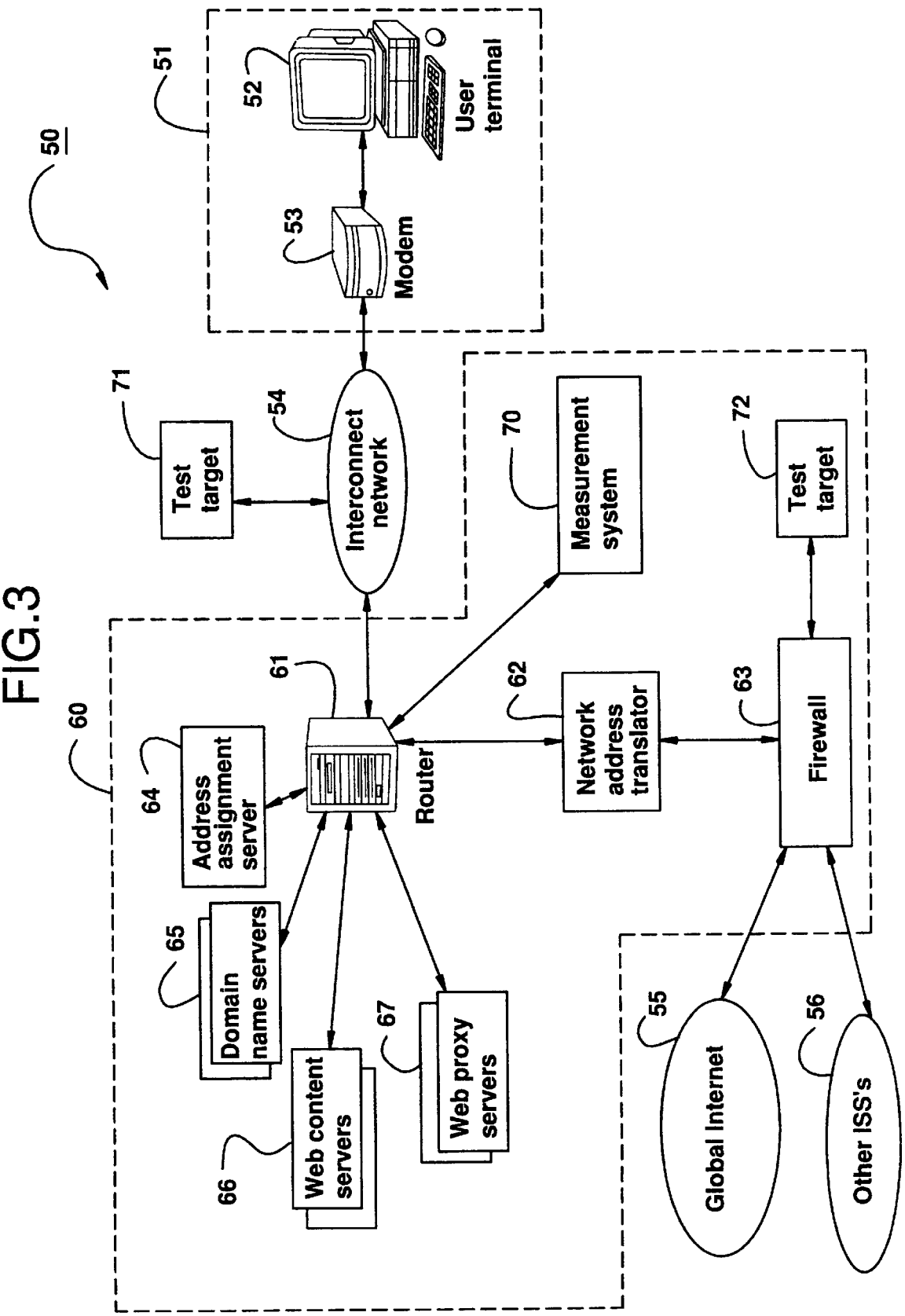
FIG. 3 shows a data service system in a data access network system, wherein the data service system includes a measurement system that implements one embodiment of the present invention.

FIG. 3 shows a data access network system 50 that includes a data service system 60. The data service system 60 can be employed by Internet/Intranet service providers to offer web services to users or subscribers. Thus the data service system 60 can be also referred to as an Internet/Intranet service system (i.e., ISS). The ISS 60 includes a measurement system 70 that measures and monitors the availability and performance of the services offered by the ISS 60 to the users in accordance with one embodiment of the present invention, which will be described in more detail below.

In addition to the ISS 60, the data access network system 50 also includes an interconnect network 54 and links to a global Internet 55 and other ISSs 56. The other ISSs 56 may include online service systems, such as America Online and Compuserve, local Internet service systems, and/or Intranet service systems. From the user's point of view, access to web content servers in the global Internet 55 and the other ISSs 56 can be regarded as two other services offered by the system 60. In addition, the interconnect network 54 can also be regarded as a module of the system 60 from the user's point of view. The ISS 60 provides Internet or Intranet service to subscriber sites via an interconnect network 54. FIG. 3 only shows one such site 5 1. The subscriber sites may be at the residences, schools, or offices of the subscribers/users.

The interconnect network 54 can be any known network. In one embodiment, the interconnect network 54 is a LAN (LAN (Local Area Network) or WAN (Wide Area Network) network. In other embodiments, the network 54 can an Ethernet, an ISDN (Integrated Services Digital Network) network, an ADSL network, a T-1 or T-3 link, a cable or wireless LMDS network, a telephone line network, or an FDDI (Fiber Distributed Data Network) network. Alternatively, the interconnect network 54 can be other known network.

The subscriber site 51 includes a terminal 52 and a modem 53. The terminal 52 can be a personal computer, a network computer, a notebook computer, a workstation, a mainframe computer, a supercomputer, or any other type of data processing system. The modem 53 is optional and may be replaced with a network adapter, depending on the network technology adopted for the interconnect network 54.

The ISS 60 includes a router 61 for routing data to and from the remote sites. The router 61 functions to connect the remote sites to the appropriate on-premises servers 64 through 67, or to the global Internet 55 or the other ISSs 56 via a firewall 63. The router 61 may operate in the Asynchronous Transfer Mode (ATM) to provide high bandwidth packet-based switching and multiplexing. The router 61 may include a number of separate routers and/or switching devices.

The servers in the ISS 60 include web content servers 66, proxy servers 67, Domain Name Servers (DNSs) 65, address assignment servers (e.g., Dynamic Host Configuration Protocol, DHCP servers) 64, and network addresses translators 62. In addition, the ISS 10 may include other servers (not shown).

The content servers 66 store Web contents that include HTML pages, gif images, video clips, etc. Data transfers to and from the content servers 66 are enabled by transport protocols such as Transport Control Protocol (TCP) and the User Datagram Protocol (UDP). The content servers 66 can support a variety of Internet applications to provide services such as access to the World Wide Web, electronic mail, bulletin boards, chat rooms, and news groups.

The proxy servers 67 may be used to enhance security of accesses to and from the remote site 51, as well as to speed up Internet access by caching frequently accessed data locally. The caching function of the proxy servers 67 improve the response time that users perceive for web accesses. Caching also reduces the number of accesses to the global Internet 55. The security feature of the proxy servers 67 allows the web operator to limit the web sites that users can access. This is done by ensuring all user accesses pass through the proxy servers 67. Better security can also be provided by restricting only the proxy servers 67 to have direct access to the global Internet 55.

The address assignment servers 64 assign an address to a user terminal when it first accesses the ISS 60. The assigned address uniquely identifies the terminal in the system 60. The address can be determined statically (i.e., at the time the user subscribes to the system 60), or dynamically (i.e., the user terminal may get a different address each time it is connected to the ISS 60). Specialized address assignment protocols such as Dynamic Host Configuration Protocol (DHCP) are used by the address assignment servers to assign addresses to user terminals.

The DNS servers 65 provide mapping between host names and network addresses. This process is referred to as name resolution. Before accessing a web content server, the subscriber's web browser application first contacts one of the DNS servers 65 to find out the network address of the web content server. The DNS server may in turn rely on other DNS servers in the ISS 60, in the global Internet 55, or in other ISSs 56 to assist in the name resolution. If the resolution fails, the web transfer is abortedTo minimize the time for the name resolution, the DNS servers 65 maintain local caches of the most recently requested host name-to-IP address mapping.

The firewall 63 controls access to and from the ISS 60 from the global Internet 55 and other ISSs 56. Firewalls may be implemented in hardware or software and are included to enhance security of the ISS 60. Examples of known firewall technologies are packet-level filters and application-level gateways (e.g., socks).

The network address translator 62 is used to translate between a "private" address and a "public" address. The "private" address is used for a user to access servers within the ISS 60 and the "public" address is used for the user to access web sites in the global Internet 55 or other ISSs 56 that are outside the ISS 60. In cases when user terminals are assigned "public" addresses directly, the ISS does not include the network address translator 62.

One of the methods for testing the performance of a service supported by the ISS 60 is to generate test traffic or signals that emulate the transmission of data when subscribers access the service. For example, to assess the performance of web accesses that use the Hyper Text Transfer Protocol (HTTP), HTTP-based test traffic is transmitted to or from the modules being tested. While the server modules such as web content servers 66 and proxy servers 67 respond to such test traffic, the networking modules such as the interconnect network 54, the firewall 63, and the router 61 do not respond to such test traffic, thereby making it difficult to assess the impact of these modules on the performance of services supported by the ISS 60. To facilitate testing of these networking modules, the ISS 60 also includes test points or test targets connected to some of the components of the system 60. FIG. 3 shows one test target 72 associated with the firewall 63. Alternatively, the test target 72 may be connected to the firewall via other modules. FIG. 3 also shows a test target 71 associated with the interconnect network 54. In practice, many more test targets may be used. In addition, the test targets used are not limited to just the networking modules. The test targets can also be used to test the functional modules. A test target can also be associated with the measurement system 70 to initiate test traffic to other functional modules and/or test targets.

Like a subscriber terminal, a test target is also assigned a network address and responds to test packets directed to it. Since the test targets are installed in the ISS 60 solely to assist in measuring and monitoring of services in the ISS 60, they are guaranteed to be available for testing at all times (unlike subscriber terminals). Moreover, since the performance of the test targets is known a priori, the test targets serve as reliable end points for testing against to evaluate the performance of different networking modules of the ISS 60.

To support testing of the performance of different services, a test target may also emulate the functions of specific servers of the ISS 60. For example, a test target may host a web server and can respond to HTTP traffic directed to it. The test targets are connected to networking modules in the ISS 60 to allow service test traffic (e.g., HTTP test traffic) to be measured through those networking modules. In this case, because the status of the test target is known, the measurement thus indicates the impact of the networking module on the availability and performance of different services supported by the ISS 60. The test targets can be implemented by known means. The test targets can be regarded as functional modules in the system 60.

The test targets are adding extra measurements routes for testing the modules of the system 60. The test targets can be connected anywhere in the system 60 to provide the extra measurement routes. For example, the test target 72 can be connected between the firewall 63 and the other ISS's 56 to test both the firewall 63 and the proxy servers 67.

All of the servers and firewalls 62–67 in the ISS 60 can be implemented by known means. The servers and firewalls 62–67 are logical components that may be run by one or more host computer systems (not seen in FIG. 3) within the ISS 60. This means that different types of servers and firewalls may be running in one host computer system or one of the servers or firewalls may be run by two or more host computer systems. The router 61 is both a physical component and a logical component of the system 60. All of the components of the ISS 60 are referred to as functional modules below.

Figure 6:
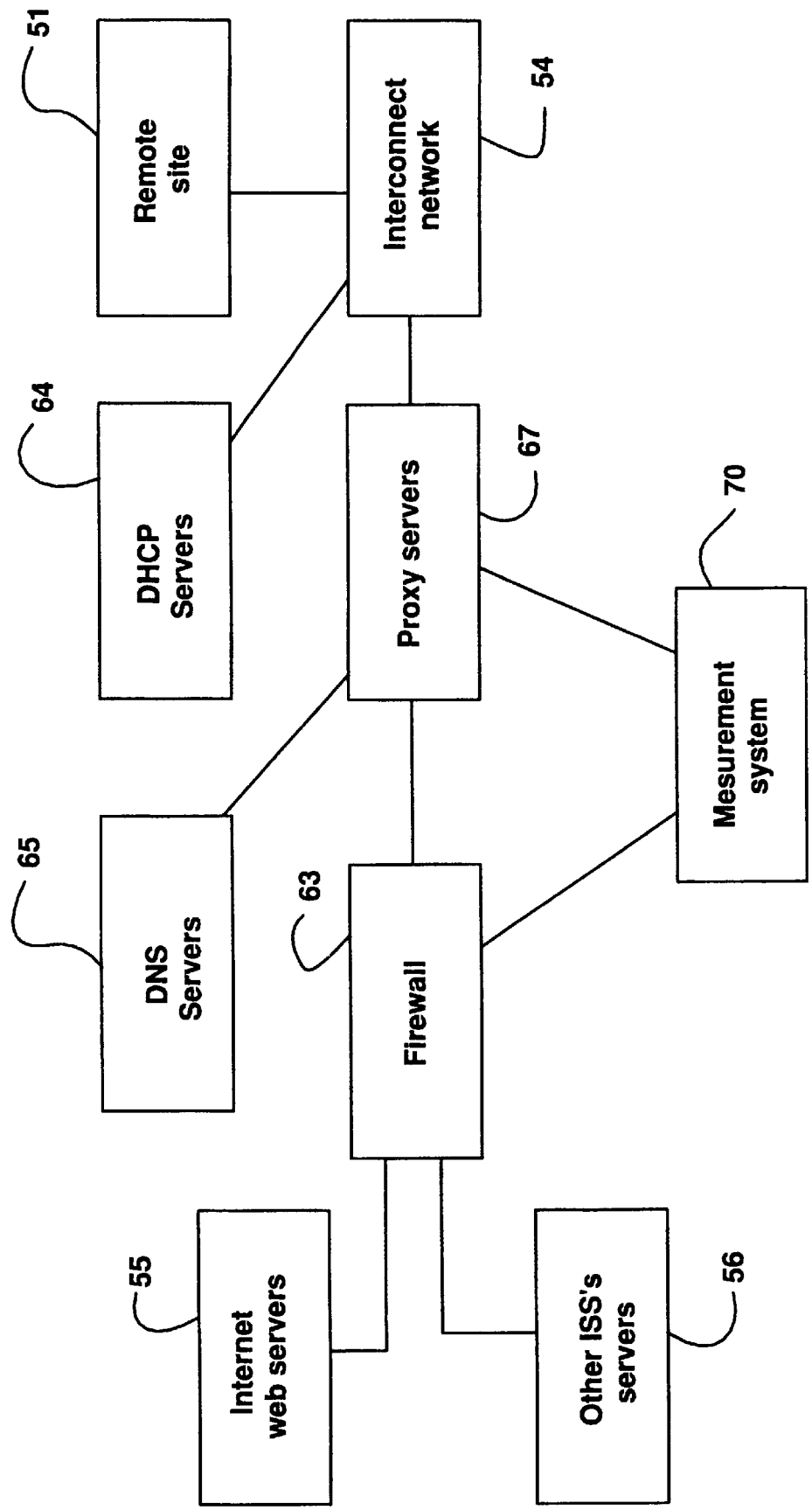
FIG. 6 shows the service topology of the data service system of FIG. 3 within the data access network system.

The ISS 60 has a physical topology and a service topology. The physical topology of the ISS 60 means the physical interconnections between (1) the remote site 51 and (2) the router 61 and the host systems of the ISS 60. As described above, the host systems run the servers and firewall 6–67. The service topology of the system 60 describes the dependencies between the functional modules of the system 60. The service topology of the system 60 also describes the routing of service traffic (i.e., service data transfers) through various functional modules of the ISS 60. In other words, the service topology depicts the logical interconnections between the different modules. FIG. 6 shows the service topology of the ISS 60, including accesses to the global Internet 55 and the other ISSs 56. It is to be noted that there may be other network routing and switching modules that are not depicted in the service topology.

For a given system such as the system 60, the service topology is also known. The service topology of a system can be changed by physically reconfiguring the host systems of the ISS 60, or by reconfiguring the functional modules of the system 60.

The users of such a system 60 may be personnel of an organization (corporation, school, etc.), or residential or commercial subscribers accessing the system 60 from their homes or offices. Using web browser applications, users can access Web pages, news, and e-mail stored in the web content servers 66 of the system 60. In addition, the users can also access Web pages located at remote sites of the global Internet 55 and the other ISSs 56.

The ISS 60 also includes a measurement system 70 that is responsible for measuring and monitoring the status of the ISS 60 and its functional modules. In one embodiment and as shown in FIG. 3, the measurement system 70 is connected to the router 61. The measurement system 70 can access all of the modules 51, 54–56, 61–67, and 71–72, of the ISS 60 via the router 61. In other embodiments, the measurement system 70 can be connected to any other module of the ISS 60. In those embodiments, the measurement system 70 may have a dedicated connection line or channel to each of the modules 51, 5–56, 61–67, and 71–72. Alternatively, the measurement system 70 may include a number of components, located at separate areas as appropriate to test the service topology of the ISS 60.

In accordance with one embodiment of the present invention, the measurement system 70 performs several measurements of the different modules of the ISS 60 and analyzes the measurement results to determine the status (i.e., availability and performance) of an individual module as well as the entire system of the ISS 60. The status information indicates whether the system is properly functioning or not, and whether any individual module is a bottleneck module in the system 60 or not. The measurement system 70 determines the status of the system 60 with a minimal number of measurements or through a minimal number of measurement routes. The measurement system 70 also identifies or isolates any problem module or modules in the system 60 by analyzing the dependencies between the modules and the measurements.

Figure 7:
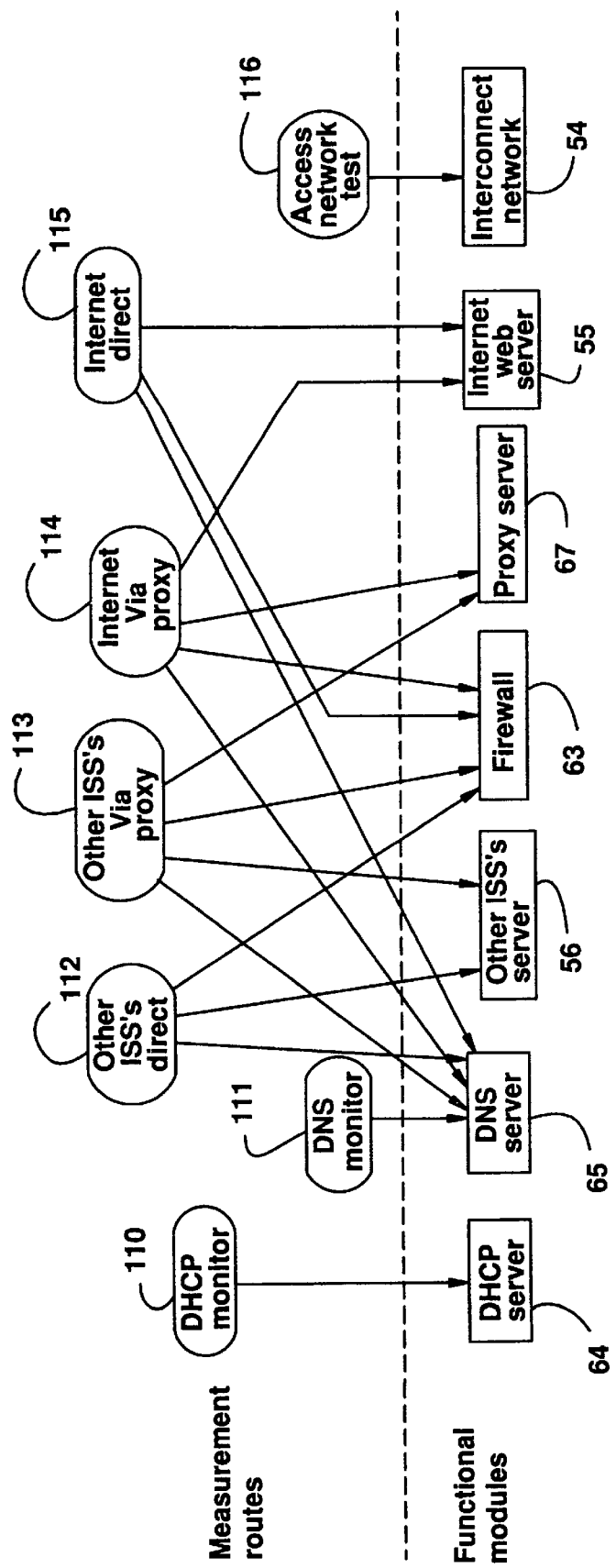
FIG. 7 shows the dependency graph between measurement routes and the interconnect network, the global Internet, the other ISSs, and the modules of the data service system based on the service topology of the data service system.

The measurement system 70 performs a number of measurement tests to assess the performance of a subset of modules of the system 60. Each subset of modules tested by a measurement test can be referred to as a measurement route. FIG. 7 shows a number of measurement routes 110 through 116, which will be described in more detail below.

Referring again to FIG. 3, to be able to assess the health of the data services provided by the system 60, the measurement system 70 uses the service topology of the system 60. As described above, the service topology defines the logical dependencies between the modules of the system 60. Based on the service topology that is pre-specified, the measurement system 70 determines all the various measurement routes that it can use to assess the status of the system 60. From this large set of measurement routes, a minimum set of measurement routes that must be performed to monitor the overall status and performance of the services of the system 60. The measurement system 70 then performs additional measurement tests to either determine the status and performance of a particular module or diagnose if the particular module is problematic or not. By correlating the results of the measurement tests with the dependencies between the subsets of modules involved in each test, problematic modules within the system 60 can be isolated or identified.

The measurement system 70 also provides independent visual representations of the test results. This provides a high level representation of the status and usage of various modules of the system 60. Comparison of the test results with pre-specified thresholds is used to trigger alarms to automatically alert system operators of problem conditions for the data services.

FIG. 4 shows the measurements collected by the measurement system 70 from the modules of the system 60. As can be seen from FIG. 4, the measurements are collected through monitors 74 through 79 associated with one or more modules of the system 60. Each monitor is associated with a measurement route. The measurements collected from the different monitors are then transported to the measurement system 70, using a combination of protocols (e.g., FTP, remote procedure invocations, the simple network management protocol). The choice of the protocol used may be specific to each monitor, depending upon its capabilities, as well as upon the type of measurements made by the monitor, its storage capacity, and the frequency of the measurements.

A variety of technologies can be employed to implement each of the monitors 74–79. FIGS. 5A–5D show four different types of monitors. Again, each of the monitors 74–79 can be implemented by any one type of the monitors shown in FIGS. 5A–5D.

Figure 5A:
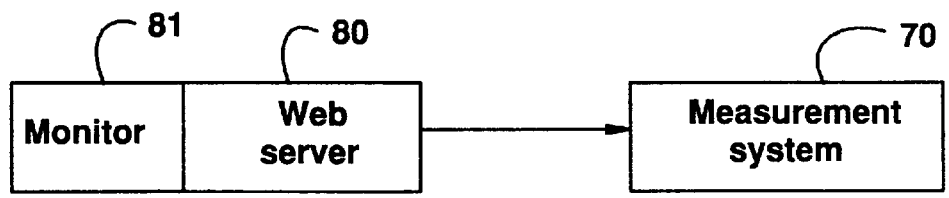
FIGS. 5A through 5D show different implementations of the monitors.

FIG. 5A shows an active internal monitor 81 that actively executes in the module 80 and gather information about the availability and performance of the data services of the system 60 from the module 80. For example, a script that executes on a web server's host machine to track the utilization of the CPU, hard disk, and memory and to determine queuing of connections in the web server's TCP stack falls in this category. Here, the module 80 can be any module of the system 60. The gathered information is then sent to the measurement system 70 by the monitor 81. The monitor 81 can be a software, hardware, or firmware module.

Figure 5B:
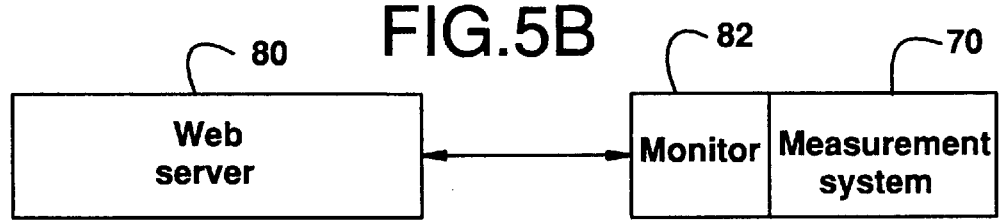

FIG. 5B shows an active external monitor 82 that is located in the measurement system 70. The monitor 82 generates test traffic that emulates typical user accesses to the services supported by the system 60 and based on the responses from the module 80 being tested, the monitor 82 actively measures the availability and performance of the module 80. The tests are active because the monitor generates test traffic to and from the target module 80 to perform the measurements. The monitor 82 is external because it does not reside on the functional module being tested. The monitor 82 does not need to be within the measurement system 70. The monitor 82 can reside on any server other than the server being tested, or it can reside at the test target 72. The active external monitors may not be specific to the operating system of the host machine that supports the module 80 or the specific implementation of the module 80 being tested. An example of an active external monitor is a monitor that generates a HTTP request for a web page stored at a web server 80 and measures the total time taken by the server 80 and the interconnect network 54 to transmit the requested web page.

Figure 5C:
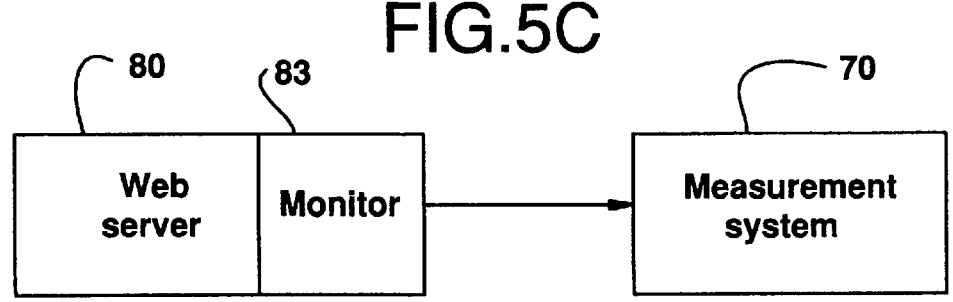

FIG. 5C shows a passive internal monitor 83 that is built into the functional module 80 that is being tested. In this case, the measurements are collected during the normal operation of the module 80. The monitor 83 is passive because it measures performance without generating additional traffic and without requiring additional processes to be executed. The measurements can collected via log files, Management Information Base (MIB) variables exported using management protocols such as the Simple Network Management Protocol (SNMP). Since they rely on instrumentation built in to the modules, the passive internal monitors are specific to the application, hardware, or system being monitored. An example of a passive internal monitor is a web server that during its normal operation measures the time taken to respond to a web page request and logs this information in its access log file.

Figure 5D:
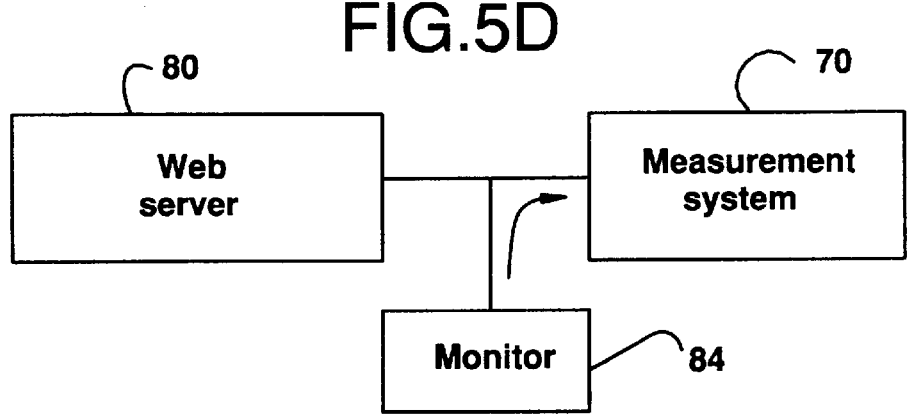

FIG. 5D shows a passive external monitor 84 that resides outside the module being monitored. This monitor operates passively because it resides on the path of data transmissions from servers to subscriber sites and collects measurements by snooping packets transmitted over the network 54. By analyzing the sequence of packets transmitted, their transmission times, and the gaps between packet transmissions, the monitor passively collects information that is useful for the measurement of the data services of the system 60. An example of a passive external monitor is a LanProbe device that tracks the performance of a web server by estimating the time interval between transmission of a request from a subscriber site and the transmission of the web page from the web server 80. Like the passive internal monitor 83, the passive external monitor 84 makes its measurements by observing real user traffic and without generating any additional test traffic.

As described above, any of the monitors 74–79 in the system 60 can fall in any of the above mentioned four categories of monitors. The specific monitors to be used in a system 60 can be specified to the measurement system 70 by the system operator. Alternatively, the measurement system 70 may itself choose a default set of monitors to use based on the service topology of the system 60. This set of monitors can be modified at any time by the system operator.

Referring to FIGS. 6 and 7, based on the service topology of the system 60 and the location and type of the monitors 74–79, the measurement system 70 determines the measurement routes 110–116. The measurement system 70 then determines the dependencies between (1) the measurement routes 110–116 and (2) the modules of system 60, the interconnect network 54, the global Internet 55, and the other ISSs 56. FIG. 7 shows such a dependency graph.

The measurement routes span various layers of protocols, measuring different features of the functional modules. The measurement routes also depend on the functional modules being tested. For example, the time taken by a web content server 66 to respond to a request for a web page is a measure of a web content server's status and can be measured by a measurement tool that emulates the typical behavior of a web browser used by subscribers. The same tool can be used to measure proxy servers 67 as well. For proxy servers 67, the measurement tool can either retrieve web pages from the proxy cache itself. The same tool can test another measurement route by forcing the proxy server to retrieve the web page from a remote web server, rather than from its cache. A third measurement route can get the data from the web server directly, rather than via the proxy server.

The measurement routes may also be based on passive methods. For instance, content and proxy server residence time for web accesses can obtained by a test tool that analyzes measurements made by the content and proxy servers 66–67 and stored in their access logs. Different measurements results can be extracted for requests that are serviced from the proxy server's cache, for accesses to the global Internet 55, and to other ISS sites 56, and used to investigate for problems in the modules of the ISS 60 that can affect these accesses.

The measurement route of the DHCP servers 64 may include measurements of the rate of address assignment failures, the response time for an address assignment, and the number of addresses allocated per network subnet. The test tool used to obtain the measurements can be a script that analyzes DHCP log files.

The measure of availability of a DNS server 65 is the percentage of DNS queries that it is able to successfully resolve. The performance of the server is the response time between when a request for name lookup is issued and when a response is received. Both availability and performance can be best measured using instrumentation built into proxy servers 67 that permit these servers to measure and log response times for DNS requests. A test tool that analyzes the log files of proxy servers can provide a passive measurement of DNS status for real user requests. In addition, the measurement routes for the DNS servers 65 also includes active measurements of their response to specific queries using a public domain tool called "dig".

As described above, to assess the status of the networking modules such as the interconnect network 54, the router 61, and the firewall 63, test targets 71, 72 that are specifically installed in the ISS 60 for testing can be used. Alternatively, in some cases, subscriber sites themselves can be used as targets to which measurement tests can be run. One of the advantages of installing specialized test targets 71, 72 in the system 60 is that the test target can support different server applications that enable service test traffic to be targeted to or generated from the test targets themselves. For instance, a test target can support a web server and can respond to test signals sent to it to transmit web pages. When connected to a firewall 63, such a test target can be used to assess the performance of web traffic transmitted through the firewall, without involving a number of the other components of the ISS 60. Such test targets may be the only way of testing modules such as a "socks" based firewall that only allows web and other TCP-based traffic to flow through it and does not respond to other non-TCP traffic.

Figure 17:
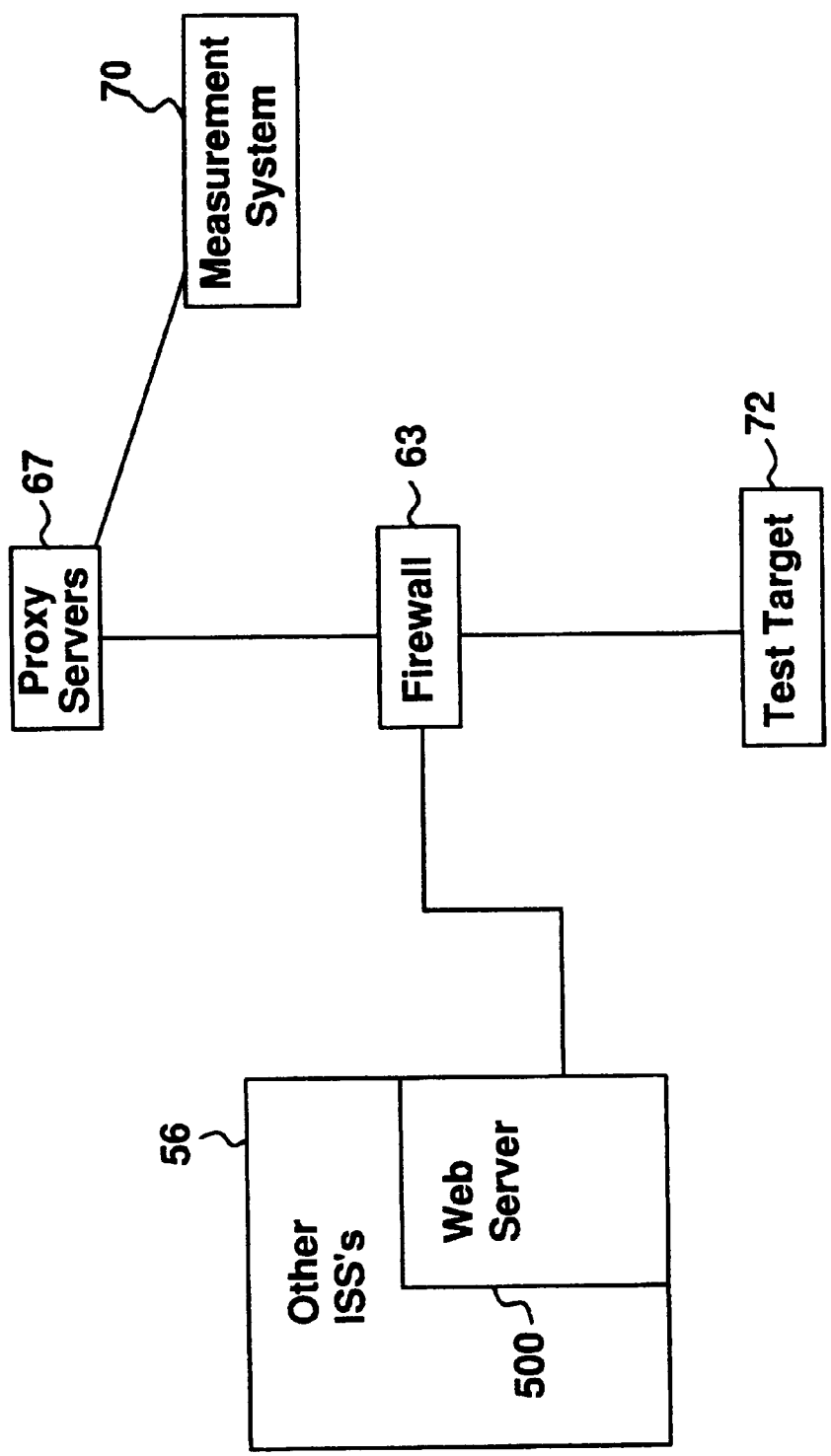
FIG. 17 shows an example of using the test target to provide extra measurement route.

Another advantage of the test target is that for some service topologies, the service topology may not permit sufficiently diverse measurement routes to be developed to diagnose or identify problem modules. In such cases, by placing test targets at strategic places in the system 60, problems may be isolated effective and efficiently. FIG. 17 shows an example. As can be seen from FIG. 17, tests can be run to the remote web server 500 of the other ISSs 56 (FIG. 3) via (1) the proxy server 67 and the firewall 63 and (2) the firewall 63 based on the service topology shown in FIG. 17. When measurements from both measurement routes show problems, there is no direct way to ascertain whether the problem is because of the remote web server 500 or because of the firewall 63. This means that the available measurement routes are not sufficient to either eliminate the firewall 63 as the problem module or positively identify it as the problem source. With the test target 72 associated with the firewall 63, an additional measurement route can be established to measure the impact of the firewall 63.

All of the measurement routes discussed so far are made to test impact of the individual module or a set of modules on the availability and performance of the data services and are referred to as the surveillance measurements. Besides these measurements, the measurement system 70 may enable other measurements to monitor specific features of the functional modules, in order to be able (1) to provide detailed information about a module that has been diagnosed as being a problem module, and (2) to be able to analyze the usage of each module and provide advance alerts than can enable a system operator to do capacity planning. Depending upon whether they support diagnostic or planning functions, the additional measurements necessary in a system 60 are referred to as the diagnostic measurements and the usage measurements. These additional measurements do not appear in the dependency graph of the system 60 and are not used to determine the current status of the system 60.

The diagnostic and usage measurements are usually specific to the different functional modules. For example, for modules that support TCP connections such as web content servers 66, proxy servers 67, and "socks"-based firewalls 63, the additional measurements can include measurements of the connection rate the modules made either from the modules' logs or from SNMP (Simple Network Management Protocol) MIBs (Management Information Base) of the modules, or by executing the netstat command on the modules' host machines. In addition, measurements of TCP listen queue length can be obtained using custom tools that lookup the relevant data structures in the kernels of the modules' host machines. Since excessive queuing in the TCP listen queues can result in long delays in service, monitoring of the TCP listen queue lengths can give an indication of misconfiguration of specific modules of the ISS 60.

For all the modules of the ISS 60, including content servers 66, proxy servers 67, firewall 63, DNS servers 65, DHCP servers 64 and routers 61, the CPU, disk, and memory utilization of the host machines and the individual modules can be measured, since overutilization of any of these fundamental resources can result in poor performance of the services supported by the ISS 60. These measurements can be obtained using test tools like Unix utilities such as netstat, vmstat, and iostat.

To assist in capacity planning, the usage measurements include measurements of network traffic supported by each of the network interfaces of the various host machines of the ISS 60. These measurements can be made by querying the MIB-II agents that are supported by most host machines. To facilitate more careful planning, the traffic supported by each of the modules must be determined, using measurements that are specific to the modules. For instance, the traffic to the content and proxy servers 66 and 67 can be measured from their log files. On the other hand, traffic supported by the DNS servers 65 may have to measured by executing a process on each DNS server host that periodically communicates with the DNS server using inter-process communication techniques such as signals to extract usage information measured by the DNS servers themselves.

To assess the status of the system 60, the measurement system 70 uses the surveillance measurement routes alone. To minimize the overheads of the measurements on the system 60, the measurement system 70 selects a minimum number of measurement routes that cover all modules of the system 60. Those measurement routes, however, provide essential measurements for determining the overall status of the system 60. For example, as can be seen from FIG. 7, the measurement route (i.e., the route 113) that retrieves a web page from a local web server that is located in the other ISSs 56 provides information about the health of the proxy servers 67, the DNS servers 65, the firewall 63, and the local web server in the other ISSs 56. If the measured response time for retrieving web pages from the local web server in the other ISSs 56 is less than a pre-specified threshold, the DNS and proxy servers 65 and 67, the local web server, and the firewall 63 are functioning as expected. If the measured response time is greater than the pre-specified threshold, then all of the modules are suspect modules and more measurements are need to show the status and performance of the individual modules, and to isolate the problem module or modules.

Figure 8:
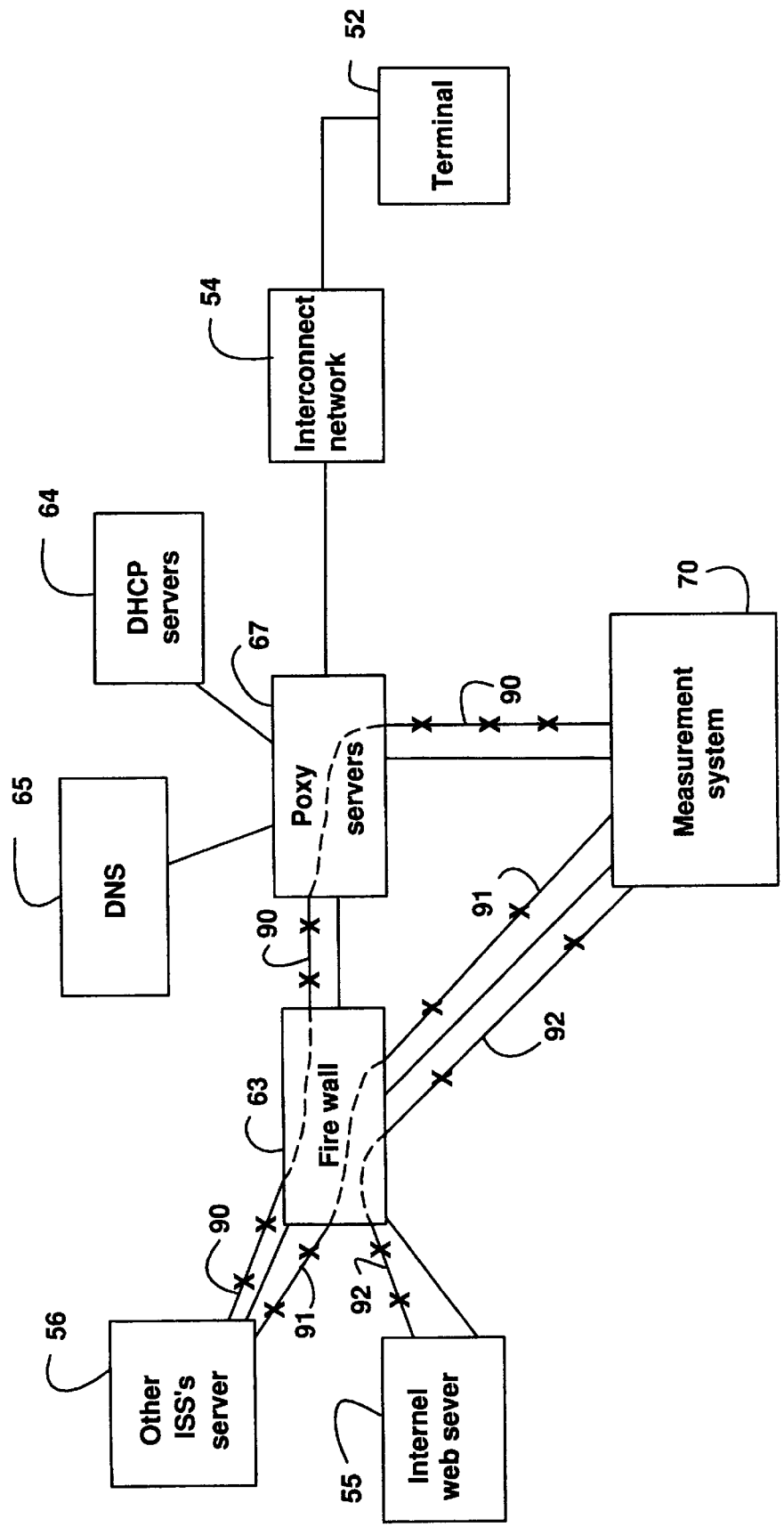
FIG. 8 shows three different measurement routes for the data service system.
Figure 9A:
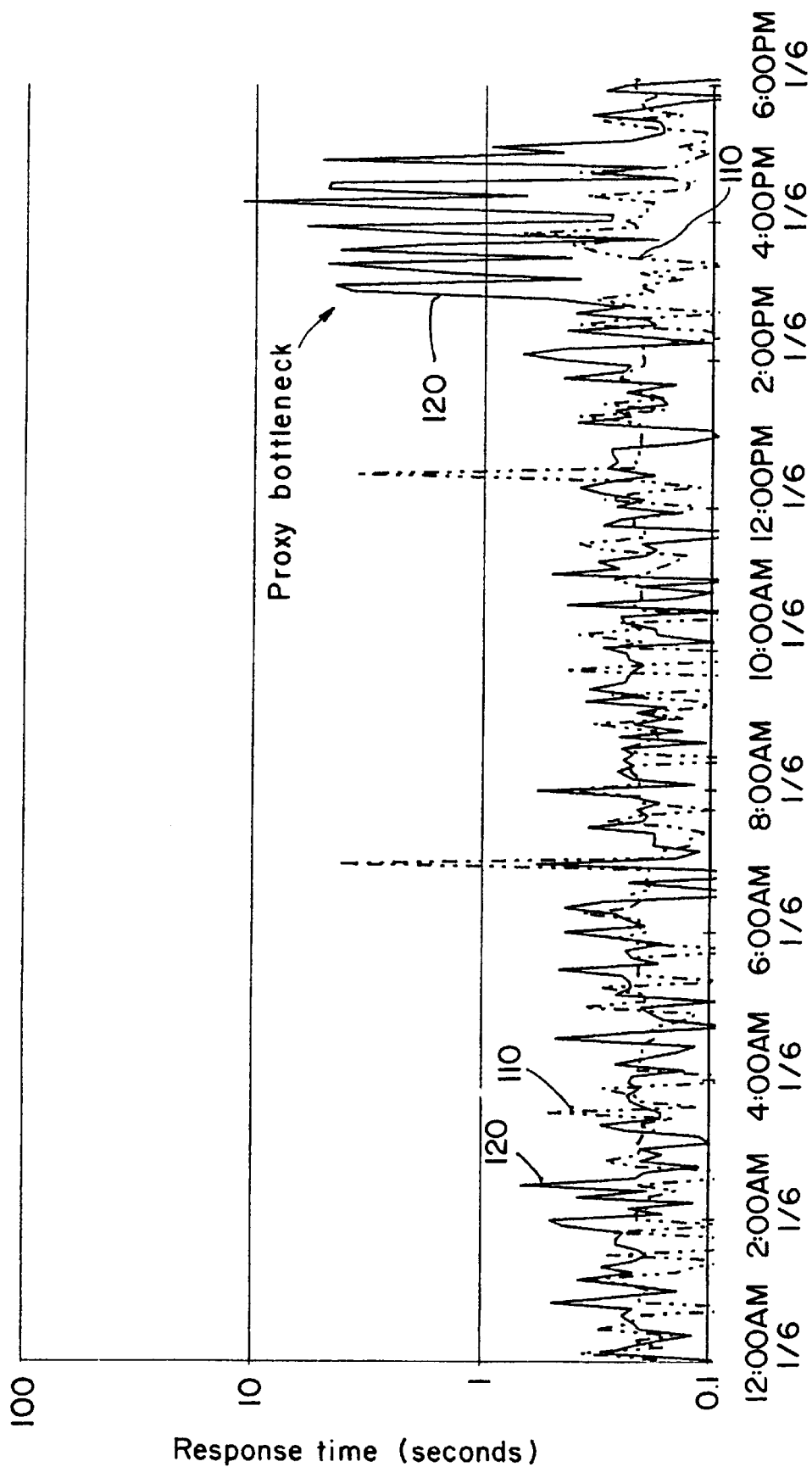
Figure 9B:
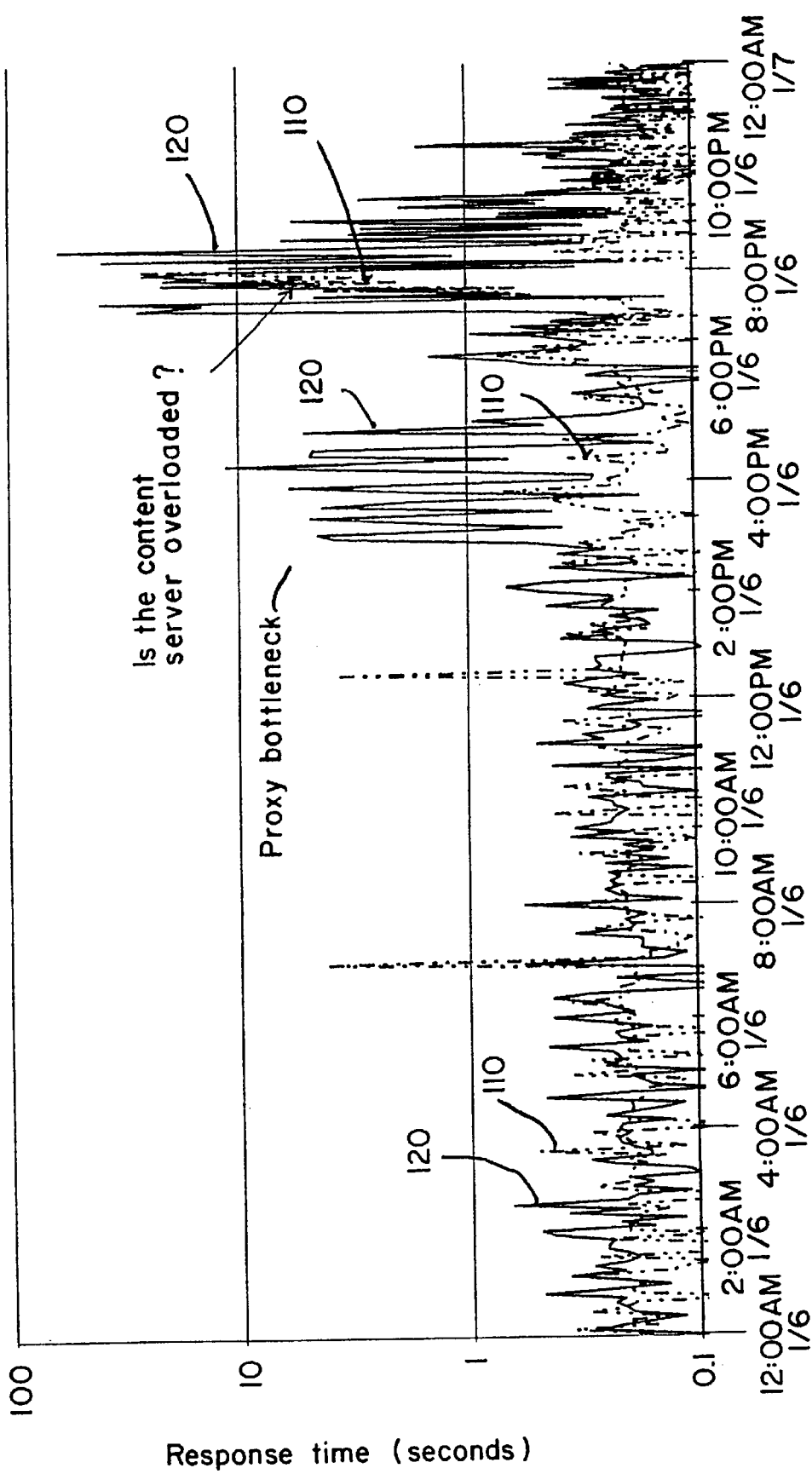
Figure 10A:
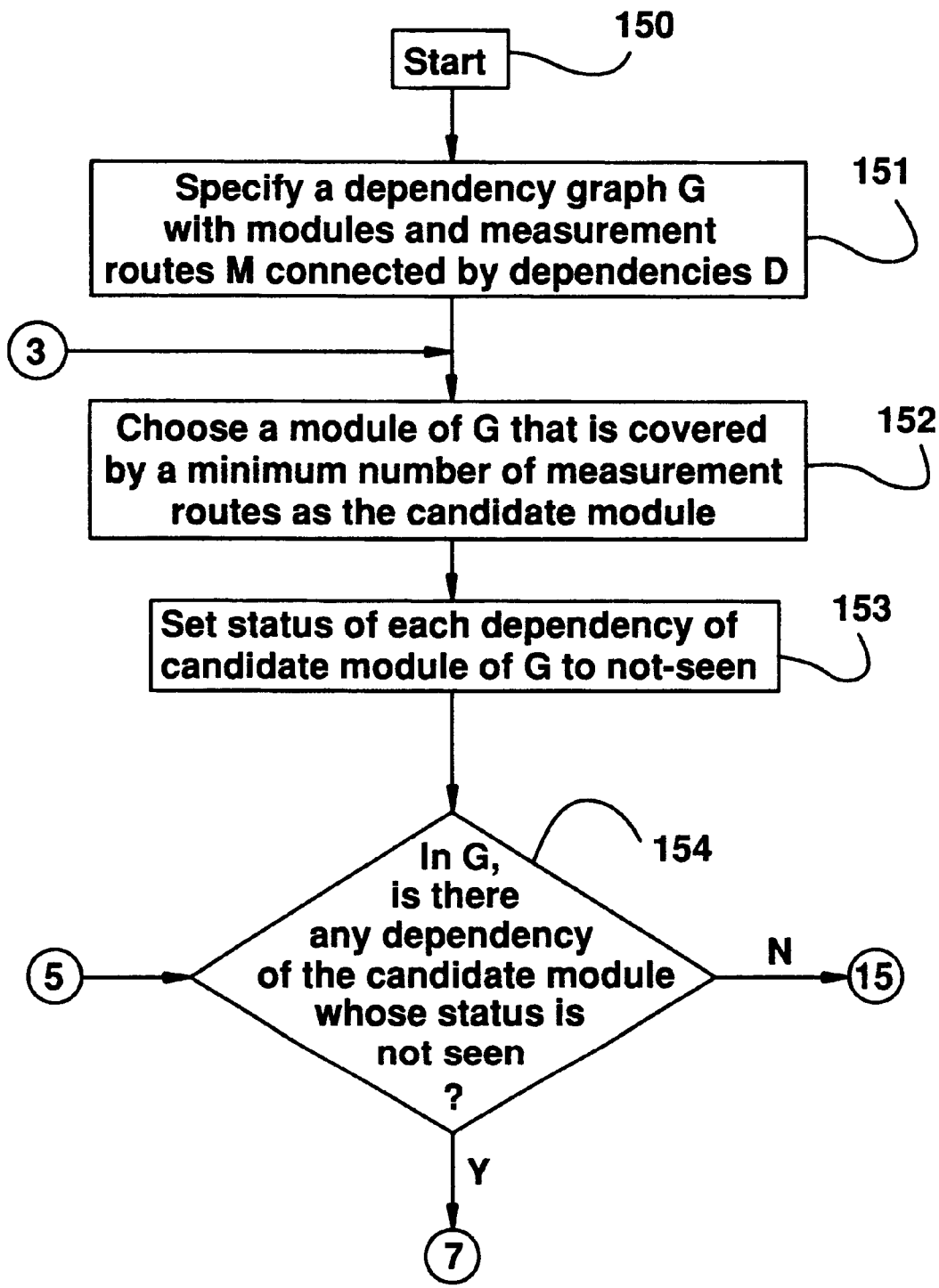
Figure 10B:
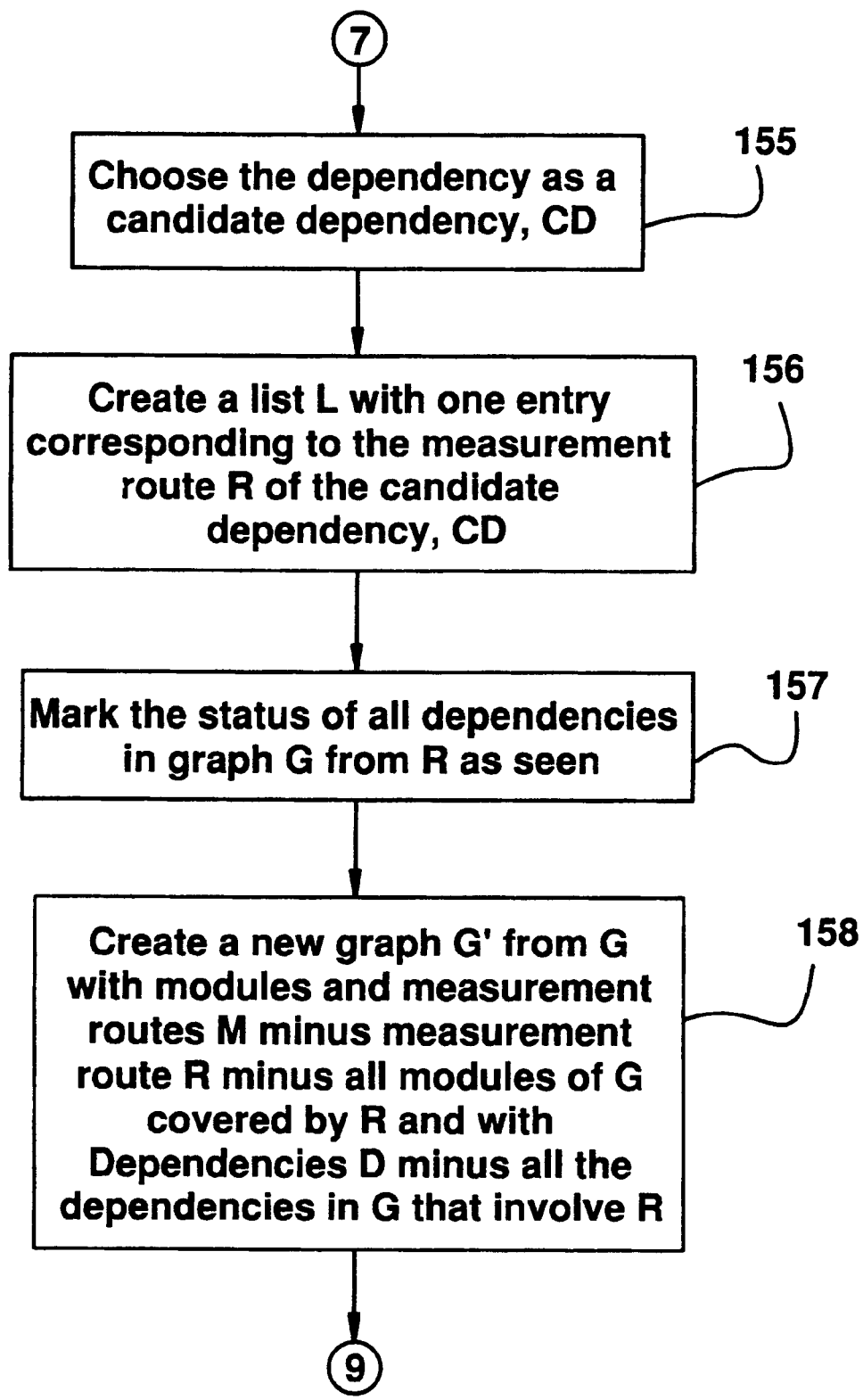
Figure 10C:
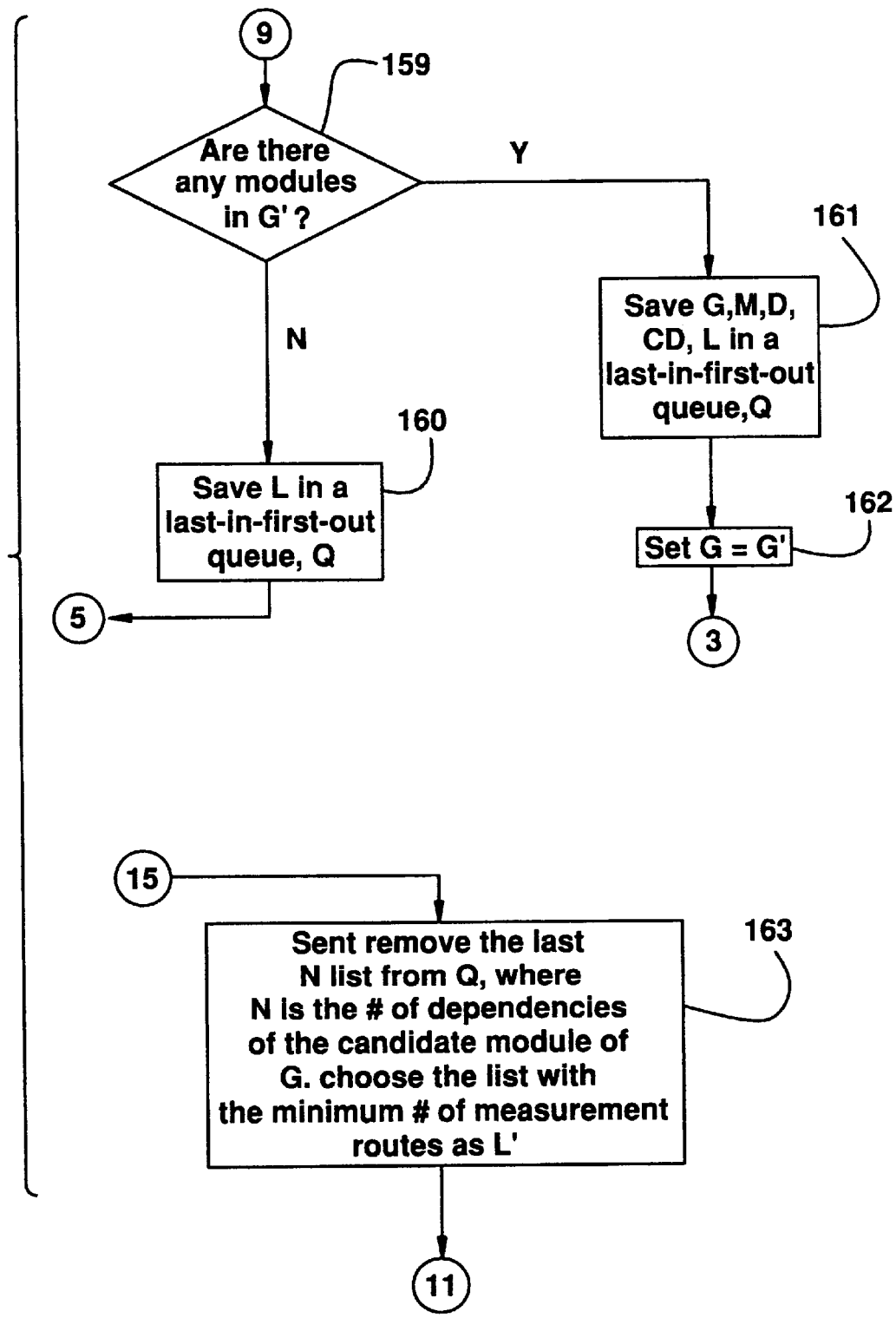
Figure 16:
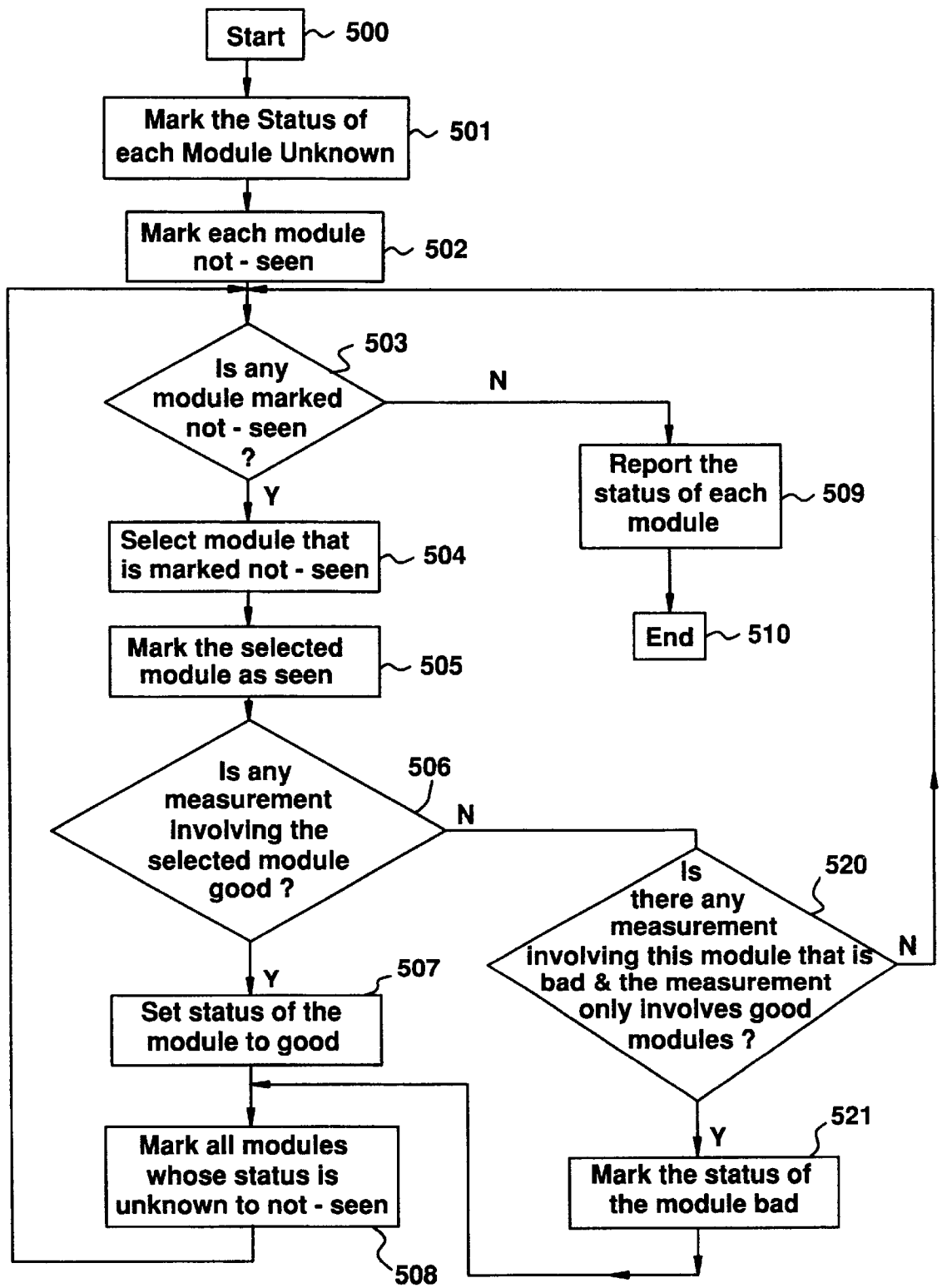
FIG. 16 shows the process for isolating or identifying the problematic modules.

The process of determining the minimum number of measurement routes is shown in FIGS. 10A–10D, which will be described in more detail below. The process of determining the status and performance of an individual module is shown in FIGS. 12A–12C, 13, and 14A–14B, which will be described in more detail below. The process of isolating the problem module is shown in FIG. 16, which will also be described in more detail below. FIG. 8 shows an example of isolating or identifying a problem module using three measurement routes 90 through 92. FIGS. 9A–9C show the measurements over time of these three measurement routes. FIGS. 9A and 9B show the measurements of the same two measurement routes, but over different and yet overlapping time periods. In FIGS. 9A–9C, the curve 120 indicates the measurements obtained via the measurement route 90 and the broken line curve 110 indicates the measurements obtained via the measurement route 91. In FIG.

9C, the solid line curve 130 indicates the measurements obtained via the measurement route 92.

As can be seen from FIG. 8, these three measurement routes all pass through the firewall 63. The measurement route 90 measures the status of the other ISS's web server 56 via the firewall 63 and the proxy servers 67. The route 91 is only via firewall 63. The measurement route 92 measures the response time to an Internet web server Internet 55 via the firewall 63. Therefore, if the measurement of any one measurement route is good, the firewall 63 can be identified as a non-problematic module. If, on the other hand, one measurement route (e.g., the measurement route 90) indicates that the performance of the system 60 is not meeting the expectation, then measurements can be taken from the measurement routes 91 and 92 to find out if the firewall 63 is the bottleneck module. If the measurement from the measurement route 91 indicates good measurement results, then the firewall 63 can be identified as the non-problematic module. If the measurement route still indicates problem, then the measurement route can be taken to further determine if the firewall 63 can be isolated.

As can be seen from FIGS. 9A–9C, a performance problem is indicated between 3:00 PM and 5:00 PM for the proxy servers 67 because the curve 120 is above the threshold level and the curve 110 is below the threshold level. In this case, because the curve 110 indicates no problem, the firewall 63 and the other ISS's web server 56 are not having problems. This basically isolates the problem to the proxy servers 67.

Another problem is indicated between 7:00PM and 9:00PM (see FIG. 9B). At this time, there are two common modules (i.e., the other ISS's web server 56 and the firewall 63) and more measurement routes are needed to isolate the problem.

To find out if the firewall 63 is performing as expected, the third measurement route 92 is used. As can be seen from FIG. 9C, the 130 130 indicates problematic performance or bottleneck at the same time. This basically identifies the firewall 63 as the most likely problematic module. As described above, the process of isolating the problem module is shown in FIG. 16, which will be described in more detail below.

FIGS. 10A–10D show the process of determining the minimum set of measurement routes necessary to assess the status of the system 60. The process shown is a graph theoretic algorithm for dissecting the dependency graph. In FIGS. 10A–10D, the dependencies D are the connection lines between the measurement routes 110–116 and the modules 54–56 and 63–67 in FIG. 7. The status "NOT_SEEN" indicates that the module has not been processed by the algorithm. The status "SEEN" indicates that the module has been processed The key idea of this algorithm is to dissect the dependency graph by first starting with the module that has a minimum number of dependencies. This ensures that the minimum set of measurement routes can be determined in the fastest possible manner. Other alternative approaches can also be used to dissect the dependency graph. For example, the dissection can begin with the measurement route that has maximum number of dependencies on modules. However, this approach requires a more elaborate trial and error procedure that takes longer to execute.

Figure 11A:
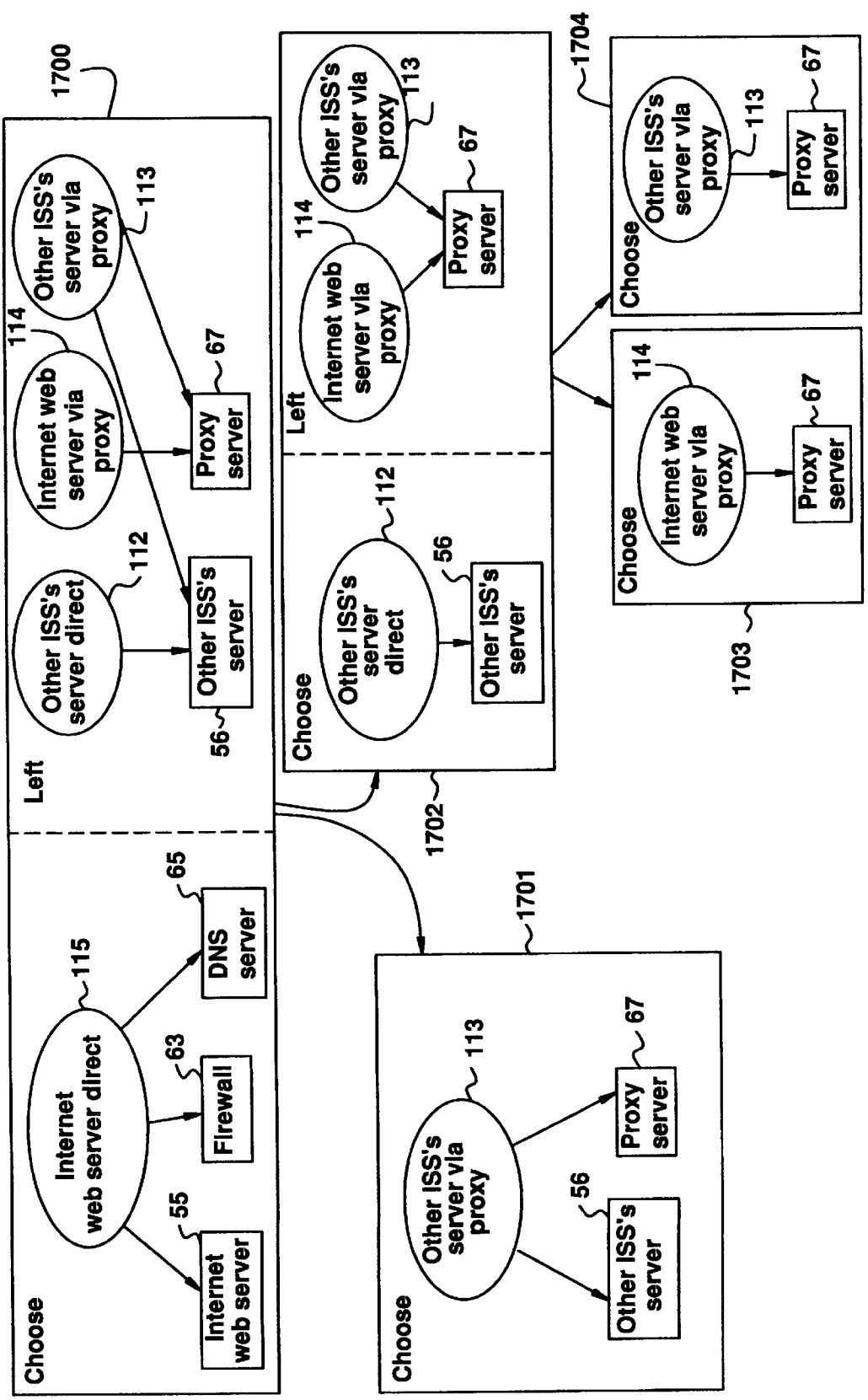
FIGS. 11A and 11B show the process of finding out the minimum number of measurement routes from the dependency graph of FIG. 7 using the scheme of FIGS. 10A–10D.
Figure 11B:
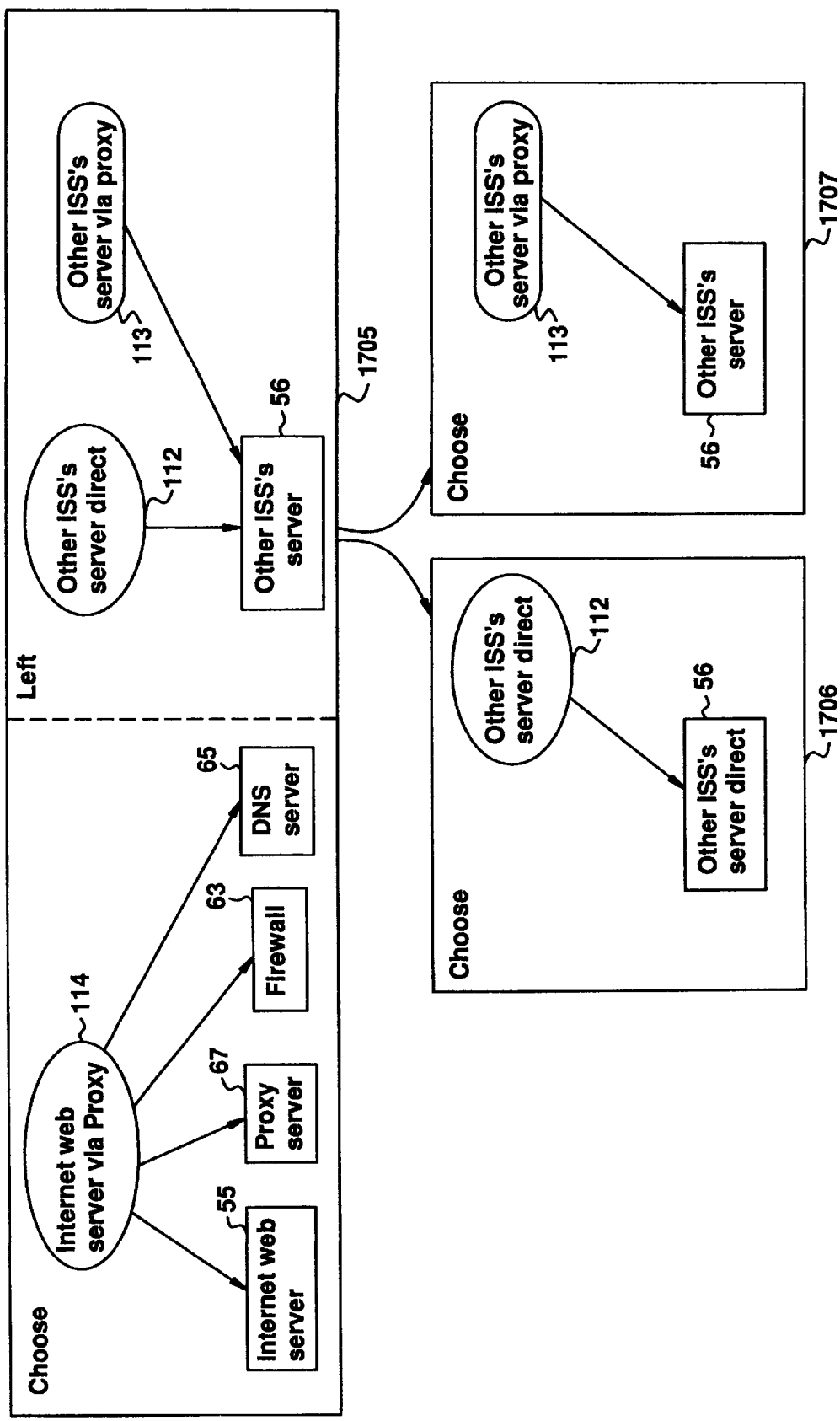

Applying the process of FIGS. 10A–10D to the dependency graph of FIG. 7, the measurement system 70 determines the minimum set of measurement routes needed for assessing the status of the system 60. The process is illustrated in FIGS. 11A and 11B. Because the DHCP servers 64 and the interconnect network 54 are independent modules, the process of FIGS. 10A–10D first includes the measurement routes corresponding to these modules in the minimum set of measurement routes for the system 60. Hence, these measurement routes are not shown in FIGS. 11A–11B.

As can be seen from FIG. 11A, the Internet web server module 55 is first selected as it has minimum number of dependencies (i.e., two). In this case, because both the proxy server 67 and the other ISS's server 56 also have the minimum number of dependencies (i.e., 2), it is not required that the module 55 be selected. FIGS. 11A and 11B show one example that starts with the module 55.

As can be seen from FIG. 11A, one of the dependencies of the module 55 which leads to the measurement route 115 is first selected (again randomly). The result is shown in block 1700 in which the left side shows the selected modules and right side shows the routes and the modules that are left in the dependency graph of FIG. 7. Considering the dependency graph of block 1700 that is left after the first step of the process of FIGS. 10A–10D, there are two possible choices for the module with minimum number of dependencies (i.e., 2). These modules are the proxy server 67 and the other ISS's server 56. FIG. 11A shows the case when the process chooses the other ISS's server 56 at random. Since there are two dependencies for the other ISS's server in the dependency graph of block 1700, there are two possible paths from block 1700 that the process considers. Choosing the measurement route 113 results in both the other ISS's server 56 and the proxy server 67 being tested. This is shown in block 1701. Since there are no more modules left, one set of measurement routes that can test the entire system 60 is the measurement routes chosen in blocks 1700 and 1701, i.e., routes 115 and 113. Another set of measurement routes is shown in block 1702 that results when route 112 is chosen to cover the other ISS's server 56. To cover the remaining module, the proxy server 67, either route 113 or 114 can be chosen (shown by blocks 1704 and 1703 in FIG. 11A). In either of the paths leading to blocks 1703 and 1704, three measurement routes (115, 112 and 113 or 114) are needed to test the system 60.

FIG. 11B shows an alternate case in which the process the other dependency of the module 55 which leads to the measurement route 114. The result is shown in block 1705 in which the left side shows the selected modules and right side shows the routes and the modules left. As can be seen from the block 1705, the measurement route 115 is determined to be redundant and eliminated. The blocks 1706 and 1707 show the following step to select the next measurement route (which can be either the route 112 or the route 113). In this case, only two measurement routes (i.e., 112 and 114 or 113–114) are needed to measure the status of the entire system. Considering all of the cases shown in FIGS. 11A and 11B, the process chooses one of the sets of measurement routes 114 and 112, 114 and 113, or 115 and 113 as the minimum set of measurement routes for the system 60.

After the minimum set of measurement routes is determined and selected, the system 60 can be monitored through the selected minimum set of measurement routes. These selected measurement routes provide the essential measurements that indicate whether the system 60 is functioning as expected or not. The resulting measurements can provide real-time indication of the status of the system 60. The measurements can be integrated to present a single rating of the status of the system 60 in totality. The rating can be depicted in various ways. The display can also show a "high watermark", indicating the worst rating achieved over a past period of time.

Because the modules in the system 60 have interdependencies, the measurements obtained from the selected minimum set of measurement routes cannot determine the status of any individual module within the system 60. These minimum set of measurements only indicate that one or more modules in the system 60 may not be performing up to expectation but they cannot help pin-point the problematic module(s) or provide any indication of performance trends for the individual modules. For example, a bottleneck firewall may slow down all connections it handles, resulting in the minimum set of measurements indicating that the system 60 has a performance bottleneck. The true status of the individual modules cannot be determined from the minimum set of measurement routes alone. Thus, more measurements routes that involve a particular module are needed such that correlation of these measurements can be made to determine the status and performance of the particular module. Described below is a rating function that correlates measurements obtained from various measurement routes involving the same module to determine the status of the module.

The rating function can operate in real-time, receiving the results obtained using different measurement routes as they become available. The rating function correlates these results to compute a single rating for each module. The rating for a module indicates the status of the module. Ratings are assigned based on thresholds of performance expectations established by the system operator. Ratings are assigned on a scale starting with 0. A rating of 1 indicates that a module's performance has reached the acceptable threshold of performance. Any further deterioration in performance is viewed as a problem (i.e., fault) in the system 60. A module with a rating less than 1 is not a problem module, while a module with a rating greater than 1 is a problem module. The extent of badness of a module is indicated by the extent to which the rating of the module exceeds 1.

Figure 12A:
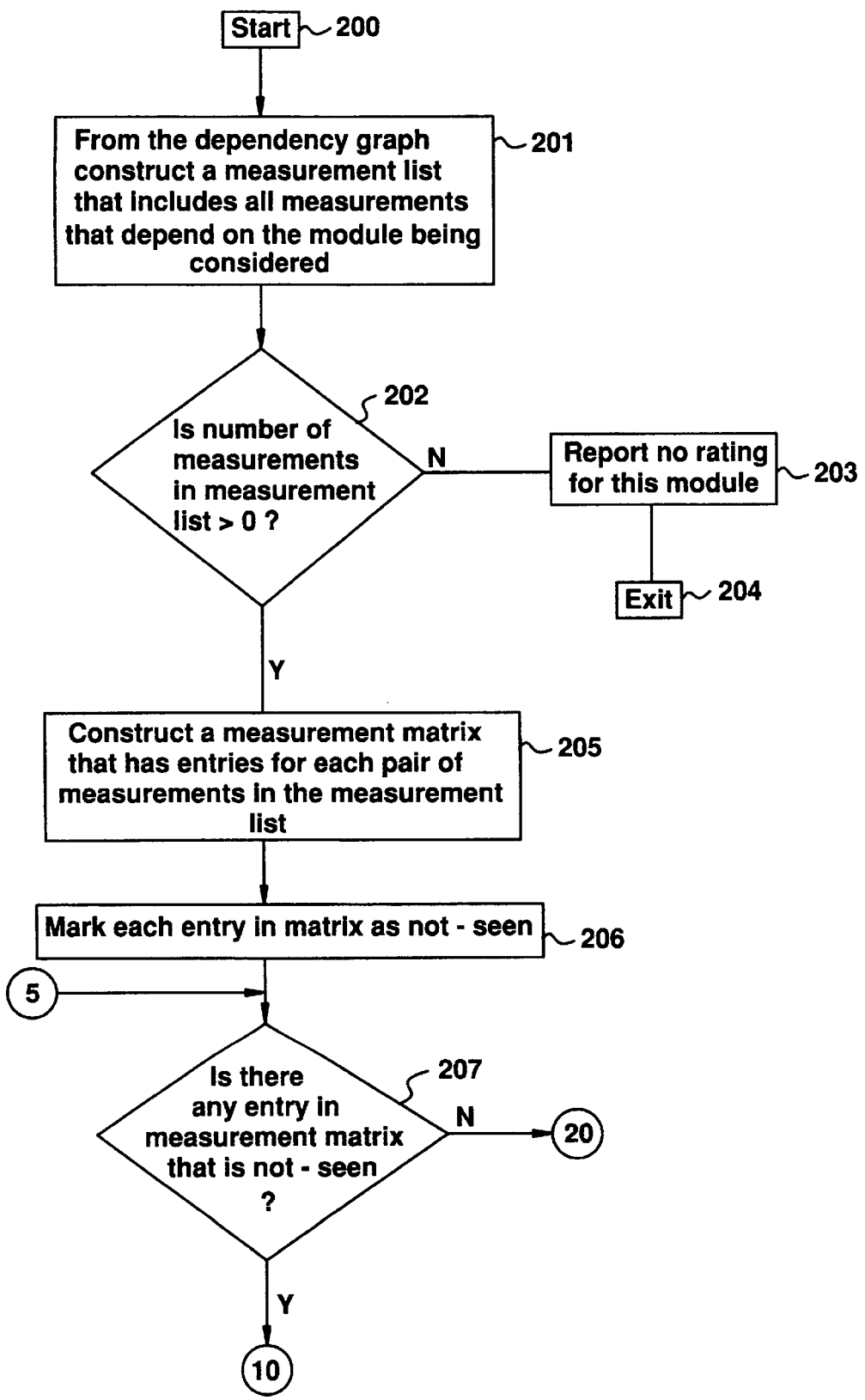
FIGS. 12A through 12C show a flow chart diagram of a rating process for assigning ratings for each module of the data service system based on its measurements to obtain status of each module.
Figure 12B:
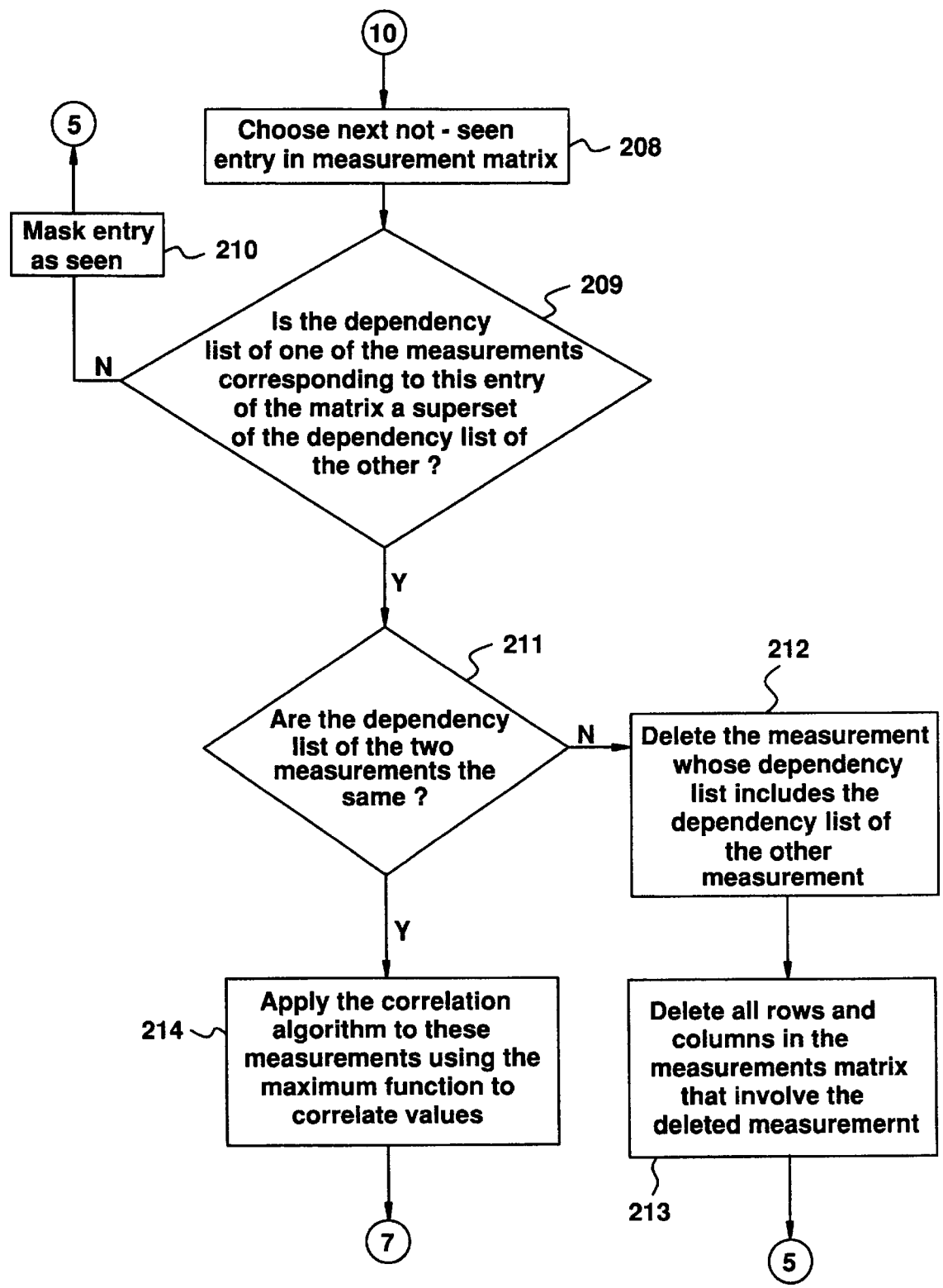
Figure 12C:
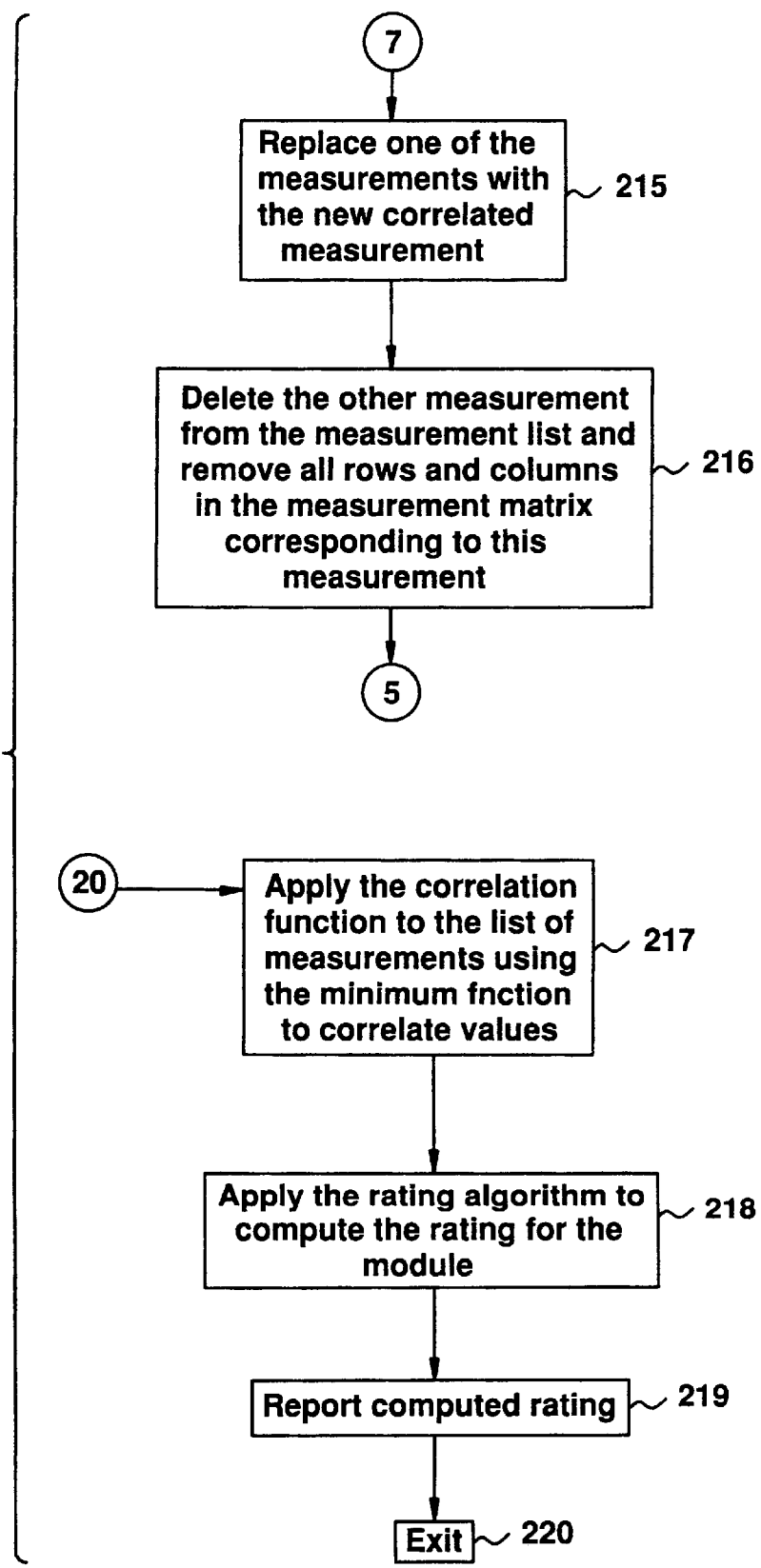

FIGS. 12A–12C describe the rating function. To derive the rating for each individual module of the system 60, the rating function uses the dependency graph for the system 60 shown in FIG. 7. Considering a specific module for which a rating must be derived, in step 201, the rating function first determines all the measurement routes in the dependency graph that cover the module. For example, in FIG. 7, the Internet web server module is covered by two measurement routes 114 and 115. In Step 202, the rating function checks to see if there is at least one measurement route that covers the specific module. If not, Step 203 is executed, indicating that no rating can be assigned to this module, and the rating function terminates in Step 204.

Figure 14A:
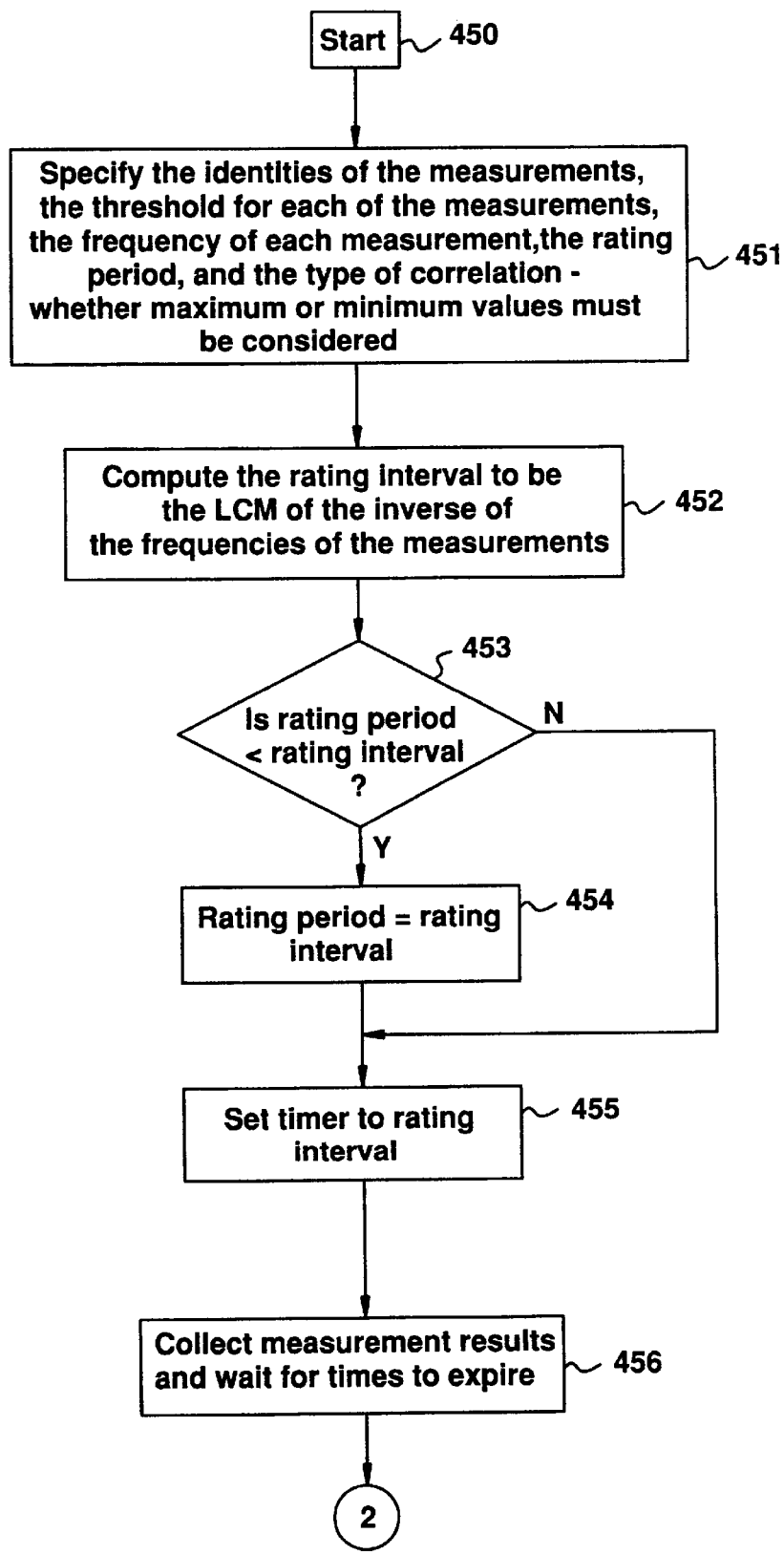
FIGS. 14A and 14B show a flow chart diagram of a correlation algorithm used by the rating process of FIGS. 12A–12C.
Figure 14B:
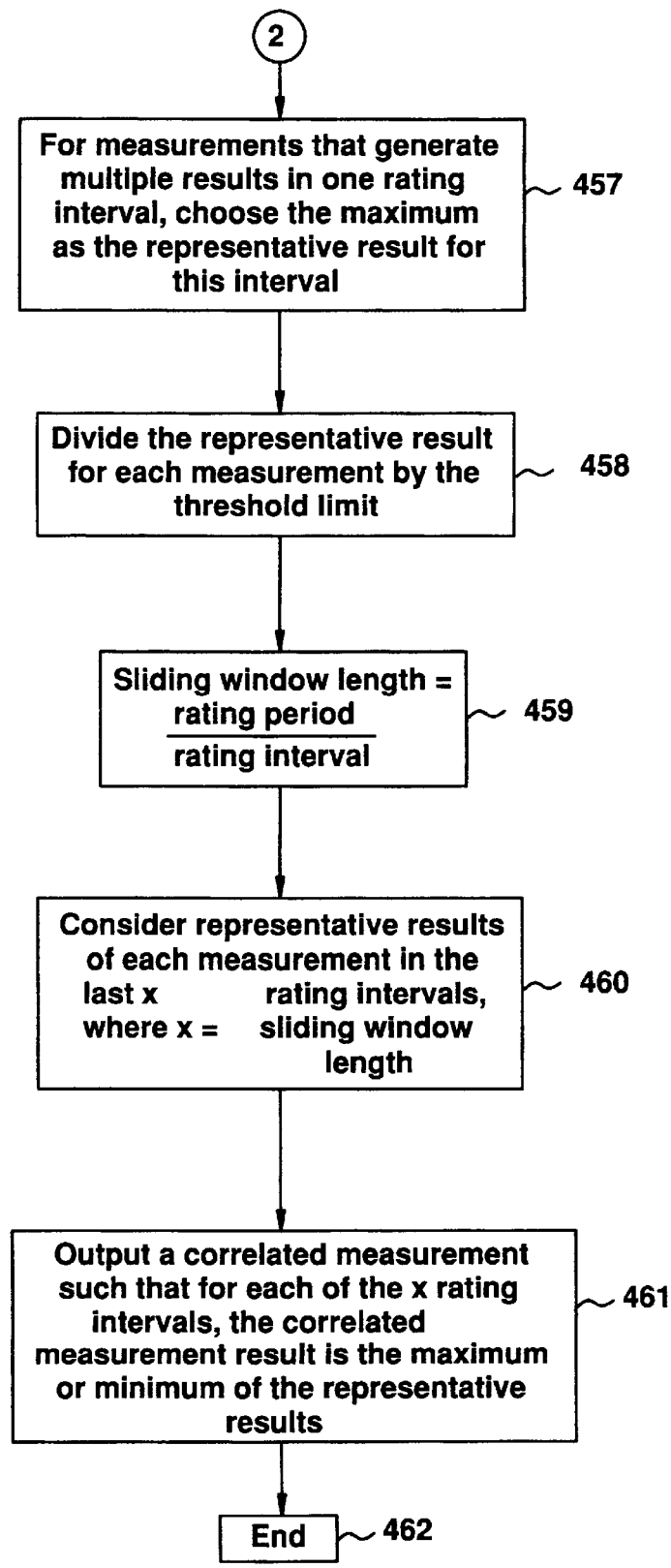

If at least one measurement route covers the specific module, in Steps 205 and 206, the rating function constructs a measurement matrix, the number of columns and rows of which are equal to the number of measurement routes covering the specific module. The measurement matrix is used to compare all the measurement routes to see if there are any overlap or redundancy between measurement routes. To be able to compare all pairs of measurement routes, in Step 206, all entries in the measurement matrix are marked as NOT_SEEN to indicate that the entries have not been processed by the rating function. Step 207 is a decision making step, when the rating function considers if there are any more pairs of measurement routes that need to be processed. If yes, Step 208 is executed to consider any pair of routes that have not been processed yet. In Step 209, the dependency list (which refer to the set of modules covered by a measurement route) of one measurement route is compared with that of another to see if there is any overlap or redundancy between the dependency lists. If there is complete overlap, indicating that the dependency list of one route is a super-set of the dependency list of another, Step 211 is executed to determine if the dependency lists are exactly the same. If yes, Step 214 is executed. In this step, the correlation algorithm shown in FIG. 14A–B is applied to synthesize one correlated measurement from the two measurement routes being considered. Since the dependency lists of the measurement lists are the same, the maximum function is applied during correlation in Step 214. In Steps 215 and 216, the two measurement routes are replaced in the dependency graph and the measurement matrix by the new correlated measurement. Then Step 207 is repeated to compare all remaining pairs of measurement routes.

In Step 211, if it is determined that the dependency lists are not the same, but one measurement route's dependency list is a proper sub-set of the other measurement route's dependency list, the latter measurement route is deleted from the dependency graph and the measurement matrix in Steps 212 and 213 since this route is considered to be a redundant measurement route. Then Step 207 is executed. If Step 209 is not true, Step 210 is executed to indicate that the current pair of measurement routes has been processed. Then Step 207 is executed again.

If at Step 207, it is determined that all pairs of measurement routes have been considered, Step 217 is executed to apply the correlation function shown in FIGS. 14A–14B to results obtained using the remaining measurement routes. In this case, the minimum function is applied. To the resulting correlated measurement, the rating algorithm of FIG. 13 is applied to compute an instantaneous rating for the module. Step 220 terminates the rating function.

FIGS. 14A–14B illustrate the correlation algorithm called during the execution of the rating function. The inputs to the correlation algorithm are the identities of the measurements being correlated together, the threshold values for each of the measurements, the frequency of each of the measurements, a rating period, and the type of correlation necessary. The rating period is a duration in time for which the correlation applies. The type of correlation necessary means whether the minimum or maximum of the correlated values are to be used to compute the rating.

Before performing any correlation, in Step 452, the rating interval is computed based on the frequencies of the measurements specified to the correlation algorithm. The rating interval denotes the time period in which at least one result from each of the measurements is likely to be available to the correlation algorithm.

To perform the correlation, the algorithm uses a sliding time window to determine measurements that should be considered. This means when new measurement results are provided by the monitors, one or more of the past measurement results may be discarded and a new rating computed. The time period for which a measurement result is relevant to the correlation algorithm is the rating period. In Step 453, the rating interval is compared with the rating period. If the rating period is less than the rating interval, Step 454 is executed to ensure that the rating period is reset to be equal to the rating interval. If not, the algorithm proceeds to Step 455. A timer is set so that the correlation is performed once every rating period. Step 456 is executed to wait for the timer to expire.

In Step 457, the algorithm considers the results from all the measurements in the each rating interval. For measurements that generate more than one result in a rating interval, the algorithm considers a statistic of the results in the rating interval. In FIG. 14B, one embodiment, the use of the maximum statistic is shown. Other embodiments of this algorithm may use other statistics such as the minimum, the mean, or the median of the results. This step ensures that measurements can be correlated independent of the frequency with which they generate results. For example, a proxy server 67 measurement may generate results once every 2 minutes, whereas a DNS server measurement may generate results once every 4 minutes. This step is referred to as normalization of frequencies of the measurements.

In Step 458, for each of the measurements, the results for each rating interval are divided by the corresponding threshold values, so that all the results can be placed on a common linear scale starting at 0. This step allows the correlation of different types of measurements. For example, the percentage of errors seen by a proxy server 67 may be one measurement and the response time of the proxy server 67 to web page retrieval requests may be another measurement. This step is referred to as normalization of the scales of the measurements.

Step 459 computes the number of rating intervals in a rating period. Step 460 considers the results in the last rating interval that must be considered for correlation.

Step 461 is executed to apply the maximum or minimum functions as appropriate to output correlated measurement results for the last rating period.

Figure 13A:
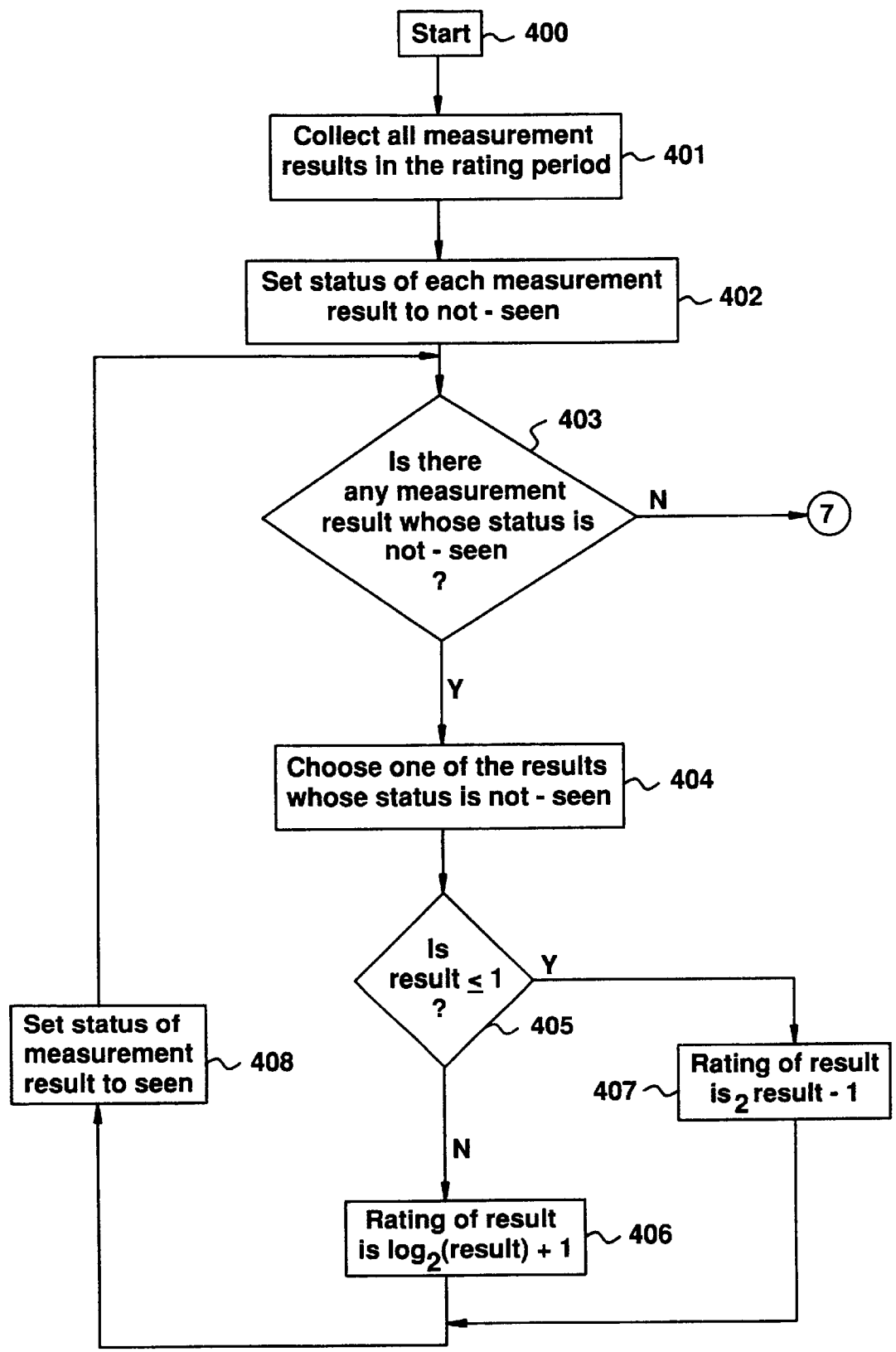
FIG. 13A and 13B show a flow chart diagram of a rating algorithm used by the rating process of FIGS. 12A–12C.
Figure 13B:
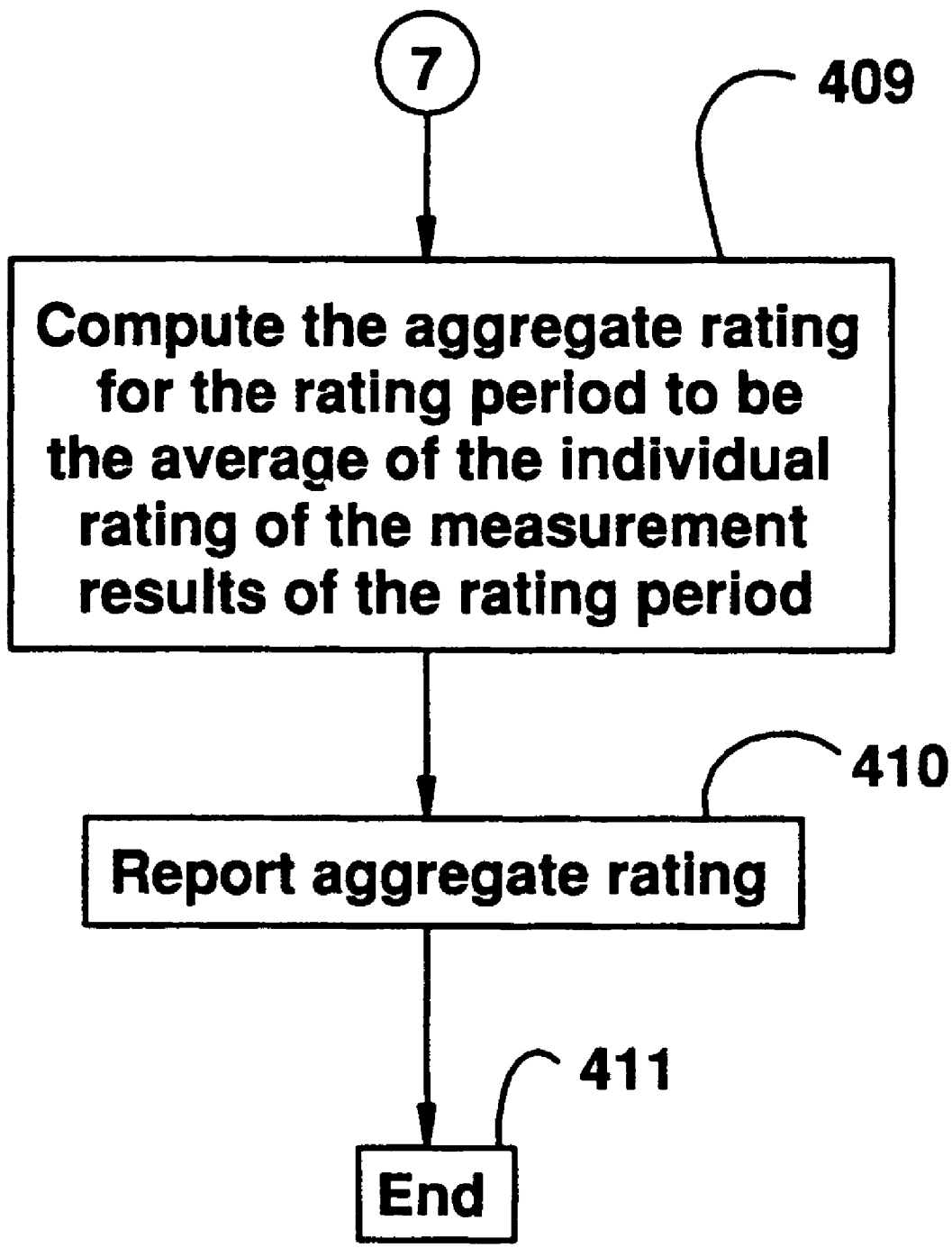

The rating function of FIGS. 12A–12C applies a rating algorithm to the correlated results from the correlation algorithm of FIGS. 14A–14B. FIGS. 13A and 13B show the rating algorithm. In Step 401, the rating algorithm collects all the results from the correlated measurements during a rating period. Rather than simply using a statistic of the collected such as the median or the mean, the rating function uses a heuristic to rate the results in a way that mimics how human operators tend to perceive the status of the system. To enable this ranking scheme, in Step 402, the algorithm sets the status of each of the results to be rated to NOT_SEEN, indicating that the results have not been processed at this step. Step 403 is a check to see if all the results have been processed. If not, at Step 404, one of the results whose status is NOT_SEEN is chosen. In Step 405, the result is compared to 1. If the result is less than or equal to 1, the rating assigned is less than or equal to 1. In this case, Step 407 is executed. In this step, the rating heuristic used assigns exponentially increasing ratings to results as they approach 1, thereby ensuring that the rating approaches 1 at a rate that is faster than that at which the result approaches 1. This serves to alert a system operator in advance, even though the status of the system 60 has not yet degraded beyond acceptable limits.

At Step 405, if the result is greater than 1, Step 406 is executed. In this case, the rating assigned is greater than 1 since the result is greater than 1. A function that logarithmically increases the rating with increase in the result is used at this step. Again, this step emulates a system operator's view of the status of the system, because beyond the acceptance limit, the criticality of the system 60 as viewed by the system operator does not increase linearly. The precise logarithmic and exponential functions used in Steps 406 and 407 are chosen such the rating is 1 when the result is 1. FIGS. 13A and B describe one embodiment of the rating algorithm in which the logarithmic and exponential functions are based on a base of 2. Any alternative value can be used in other embodiments.

After Steps 406 and 407, Step 408 is executed to set the status of the result to SEEN, indicating that the value has been processed. Then Step 403 is repeated. If in Step 403 it is determined that all results have been processed, the algorithm moves to Step 409. In this step, a statistic of the ratings assigned to each of the measurement results in the rating period is used as the aggregate rating. FIG. 13B shows one embodiment in which the average of the ratings is used as the aggregate rating for the rating period. The aggregate rating is reported in Step 410 and the algorithm ends in Step 411.

Figure 15:
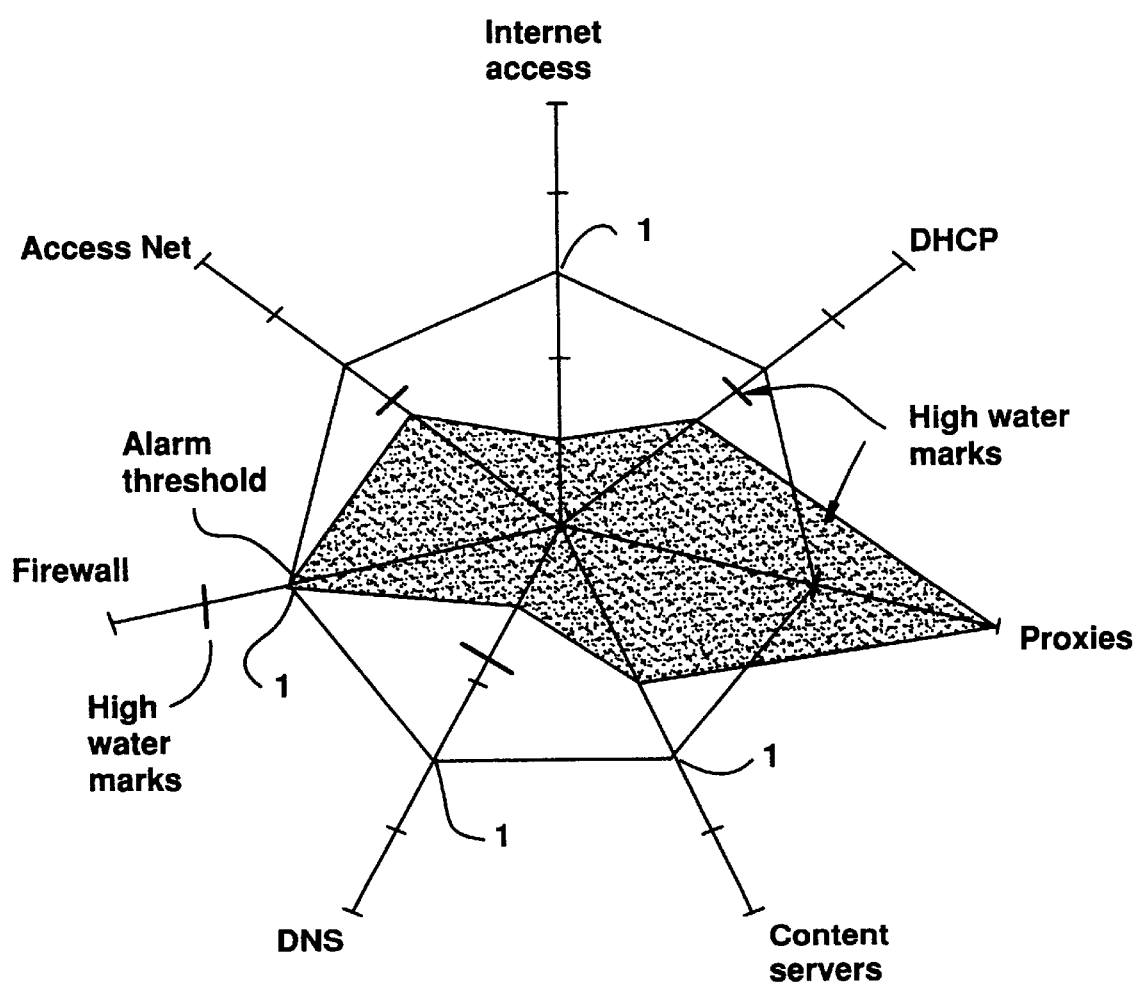
FIG. 15 shows the display of the measurement system, illustrating the status of different modules measured by the measurement system.

FIG. 15 shows an example of the use of the ratings for various modules of the system 60 obtained by applying the rating function of FIGS. 12A–12D. As can be seen from FIG. 15, the rating can be specified on a scale of 0 to infinity, with a rating of 0 representing perfect idealized behavior and a rating of 1 or more indicating whether the availability and/or performance of an individual module has dropped below expectation. The ratings of all the individual modules are then gathered together to form the radar diagram of FIG. 15. The color of the shaded area indicates whether the system 60 is performing to expectation or not. For instance, the shaded area can be colored green if all the modules of the system 60 have ratings below 1. The color can be changed to red, indicating a problem in the system 60, if any of the modules has a rating of 1 or more. To give an indication of trends in performance of the different modules, even when the rating is below 1, a high watermark that indicates past performance of the modules is shown in FIG. 15 for each of the modules.

FIG. 15 represents one possible way of using the ratings to present an integrated view of the status of the system 60 and its modules. Other alternative visual representations (e.g., using gauges to represent the status of each module) are possible.

The measurement system 70 (FIG. 3) can be integrated with network management platforms such as HP OpenView (sold by Hewlett-Packard Co. of Palo Alto, Calif.) and NetManager (sold by Sun Microsystems), to enable the generation of alarms based on trends in the performance of any of the modules or the system 60.

This display function of the measurement system 70 provides real-time access to the result of the measurements of the individual module. This result can also be made available in real-time to facilitate the diagnosis process in isolating the problem modules, which will be described in more detail below.

FIG. 16 shows the diagnosis process for isolating or identifying problematic modules in the system 60 based on the status display of FIG. 15. FIG. 16 shows the algorithm for diagnosing the problem module using the dependency graph of FIG. 7. Diagnosis is simple if there is only one module in FIG. 15 that has a rating of 1 or more. In this case, the module with a rating of 1 or more is the problem module. When several modules have a rating of one or more, it is unclear whether all of those modules are problem modules or whether only a subset of those modules are problem modules. The complexity in diagnosis occurs because of the interdependencies between modules. As can be seen in the example of FIGS. 15, two modules, namely the proxy server 67 and the firewall 63 have ratings of one or more. From the service topology in FIG. 7, it is clear that a bottleneck firewall 63 may slow down all connections it handles, resulting in an accumulation of connections at the proxy server 67. Consequently, the proxy server 67 itself may appear to be slowing down in its performance. In this case, the degradation in performance of the proxy server 67 is attributable to the firewall 63. Hence, the firewall 63 is the real problem module, although the proxy server 67 also has a rating of 1 or more.

In order to isolate a module (i.e., identify whether the module has a problem), the module must have been measured by at least two different measurement routes. The algorithm of FIG. 16 uses two approaches for isolating a module. One is referred to as positive isolation and the other is referred to as negative isolation. The positive isolation identifies the module as the malfunctioning module when two measurement routes A and B can be determined such that (1) the dependency list of B includes the module under consideration but the dependency list of A does not, (2) the dependency list of A is a subset of the dependency list of B, and (3) measurement route A is performing up to expectation but measurement route B is not. The negative isolation rules out the functioning modules. It determines whether a set of modules involved in a number of measurement routes can be determined as good. By choosing a number of measurement routes that rule out a number of modules, the problem module or modules can be identified.

FIG. 16 shows the diagnosis process in detail. Initially, in Step 501, the status of all modules is marked as UNKNOWN. In Step 502, all modules are marked as NOT_SEEN to indicate that the process has not considered these modules as yet. In Step 503, the process checks to see if all modules have been processed. If not, the process continues to Step 504. In Step 504, one of the modules not processed is considered. In Step 506, negative isolation is applied. If any measurement route involving the module is good, Step 507 is executed to set the status of the module to GOOD. At the same time, in Step 508, all modules whose status is UNKNOWN are marked as NOT_SEEN to indicate that the process needs to consider these modules again, to check if it can now determine whether these modules are GOOD or BAD. If negative isolation is not possible in Step 506, i.e., the answer to the comparison is no, Step 520 is applied. This step executes the positive isolation rule to see if a module can be marked as BAD. If yes, Step 521 is executed, followed by Step 508. After Step 508, the process returns to check for other NOT_SEEN modules. If Step 520 does not succeed, the status of the module is left as UNKNOWN and the process proceeds to Step 503.

If at Step 503, it is determined that all modules are marked as SEEN, Step 509 is executed to report the status of all modules. Modules reported BAD at this step are the primary problematic modules in the system 60. Modules reported UNKNOWN are modules whose status may be affected by the problematic modules of the system 60.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A method of determining status of a module among a plurality of modules of a data service system, the method comprising:
   (A) collecting measurements from at least one measurement route that involves the module;
   (B) analyzing interdependencies of the measurements to determine the status of the module, wherein the step (B) further comprises
      (I) determining the status of the module if only one measurement route involves the module;
      (II) if two or more measurement routes involve the module, then correlating the measurements based on their interdependencies.

2. The method of claim 1, further comprising the step of displaying the status of the module.

3. The method of claim 1, wherein the measurements include active measurements and passive measurements.

4. The method of claim 1, wherein the step (A) further comprises
   (a) finding all measurement routes that involve the module;
   (b) collecting the measurements from all the measurement routes that involve the module.

5. The method of claim 1, wherein the step (II) further comprises
   (a) normalizing the measurements to the same scale of values and frequency of measurements;
   (b) finding which of the measurements are redundant and which of the measurements are non-redundant;
   (c) removing the redundant measurements from consideration;
   (d) for the non-redundant measurements, finding measurements that cover the same set of modules and adopting maximum values of these measurements;
   (e) applying a minimum correlation function to all the remaining measurements to determine a representative correlated measurement;
   (f) applying a rating function to the representative correlated measurement to obtain the status of the module.

6. The method of claim 5, wherein the normalization function compares the values of each measurement to a predetermined threshold value for that measurement.

7. The method of claim 1, wherein the modules can be functional modules or physical modules and the data service system is a web service system, wherein the status includes the information of availability or performance.

8. A method of determining status of a data service system by a minimal number of measurements, wherein the data service system has a plurality of modules, comprising:
   (A) determining all possible measurement routes for measuring all of the modules based on a predetermined topology of the system;
   (B) determining dependencies between the modules and the measurement routes;
   (C) analyzing the dependencies to select a minimal number of measurement routes that involve all of the modules to determine the status of the system.

9. The method of claim 8, further comprising the step of displaying the status of the data service system.

10. The method of claim 8, wherein the step (B) further comprises the step of generating a dependency graph between the modules and the measurement routes.

11. The method of claim 10, wherein the step (C) further comprises the steps of
   (I) determining the number of measurement routes each module is involved;
   (II) selecting a module that is covered by a minimum number of measurement routes;
   (III) removing the module and one of the measurement routes that covers the module from the dependency graph, wherein all other modules covered by the particular measurement route are also removed from the dependency graph;
   (IV) repeating the steps (II) and (III) until there is no module in the dependency graph;

(V) calculating a first total number and total set of the measurement routes removed from the dependency graph.

12. The method of claim 11, further comprising the step of repeating the steps (I) through (V) for each of the dependencies involving the selected module until the minimal number and set is determined.

13. The method of claim 8, wherein the modules can be functional modules or physical modules and the data service system is a web service system.

14. The method of claim 8, wherein the status includes the information of availability or performance.

15. A method of determining if a module among a plurality of modules of a data service system is a problematic module, comprising:
   (A) analyzing a number of measurements that involve the module, wherein the step (A) further comprises
      a) determining from a dependency graph whether the number of measurements involve other known problematic modules, wherein the dependency graph shows interdependencies between the measurements and the modules;
      b) determining which measurement of the measurements does not involve other known problematic modules;
      c) identifying that measurement as good;
   (B) if one of the measurements is good, then identifying the module as non-problematic;
   (C) if one of the measurements that only involves the module is problematic, then identifying the module as problematic.

16. The method of claim 15, further comprising the step of identifying the module as problematic if one of the measurements involving only the module and other known non-problematic modules is problematic.

17. The method of claim 15, wherein the modules can be functional modules or physical modules and the data service system is a web service system, wherein the status includes the information of availability or performance.

18. An apparatus, comprising:
   (A) a storage medium;
   (B) a software program stored in the storage medium to, when executed by a computer system, determine status of a module among a plurality of modules of a data service system, the software comprising
      (I) a first set of instructions that collect measurements from at least one measurement route that involves the module;
      (II) a second set of instructions that analyze interdependencies of the measurements to determine the status of the module, wherein the second set of instructions further
         determine the status of the module if only one measurement route involves the module;
         correlate the measurements based on their interdependencies if two or more measurement routes involve the module.

19. The apparatus of claim 18, wherein the software program further comprises a third set of instructions that display the status of the module, wherein the measurements include active measurements and passive measurements.

20. The apparatus of claim 18, wherein the software program further comprises a fourth set of instructions that
   find all measurement routes that involve the module; and
   collect the measurements from all the measurement routes that involve the module.

21. The apparatus of claim 18, wherein correlation of the measurements is done by
   normalizing the measurements to the same scale;
   finding which of the measurements are redundant and which of the measurements are non-redundant;
   removing the redundant measurements from consideration;
   for the non-redundant measurements, finding measurements that cover the same set of modules and adopting maximum values of these measurements;
   applying a minimum correlation function to all the remaining measurements to determine a representative correlated measurement;
   applying a rating function to the representative correlated measurement to obtain the status of the module.

22. The apparatus of claim 21, wherein the rating function compares the values of one of the measurements to a predetermined threshold value for that measurement.

23. An apparatus, comprising:
   (A) a storage medium;
   (B) a software program stored in the storage medium to, when executed by a computer system, determine status of a data service system having a plurality of modules by a minimal number of measurements, the software comprising
      (I) a first set of instructions that determine all possible measurement routes for measuring all of the modules based on a predetermined topology of the system;
      (II) a second set of instructions that determine dependencies between the modules and the measurement routes;
      (III) a third set of instructions that analyze the dependencies to select a minimal number of measurement routes that involve all of the modules to determine the status of the system.

24. The apparatus of claim 23, wherein the software program further comprises a third set of instructions that display the status that includes information of availability or performance of the system, wherein the measurements include active and passive measurements, wherein the modules can be functional modules or physical modules and the data service system is a web service system.

25. The apparatus of claim 23, wherein the second set of instructions further generate a dependency graph between the modules and the measurement routes.

26. The apparatus of claim 25, wherein the third set of instructions further perform the following steps
   (I) determining the number of measurement routes each module is involved;
   (II) selecting a module that is covered by a minimum number of measurement routes;
   (III) removing the module and one of the measurement routes that covers the module from the dependency graph, wherein all other modules covered by the particular measurement route are also removed from the dependency graph;
   (IV) repeating the steps (II) and (III) until there is no module in the dependency graph;
   (V) calculating a first total number and total set of the measurement routes removed from the dependency graph.

27. The apparatus of claim 26, further comprising a fifth set of instructions that repeat the steps (I) through (V) for each of the dependencies involving the selected module until the minimal number is determined.

28. An apparatus, comprising:
(A) a storage medium;
(B) a software program stored in the storage medium to, when executed by a computer system, determine if a module among a plurality of modules of a data service system is a problematic module, the software comprising
   (I) a first set of instructions that analyze a number of measurements that involve the module, wherein the first set of instructions further
      determine from a dependency graph whether the number of measurements involve other known problematic modules, wherein the dependency graph shows inter-dependency between the measurements and the modules;
      determine which measurement of the measurements does not involve other known problematic modules;
      identify that measurement as good;
   (II) a second set of instructions that identify the module as non-problematic if one of the measurements is good;
   (III) a third set of instructions that identify the module as problematic if one of the measurements that only involves the module is problematic.

29. The apparatus of claim 28, further comprising a forth set of instructions that identify the module as problematic if one of the measurements that only involves the module and other known non-problematic modules is problematic.

30. The apparatus of claim 28, wherein the modules can be functional modules or physical modules and the data service system is a web service system, wherein the status includes the information of availability or performance.

* * * * *